US011636307B2

(12) United States Patent
Urtasun et al.

(10) Patent No.: US 11,636,307 B2
(45) Date of Patent: Apr. 25, 2023

(54) SYSTEMS AND METHODS FOR GENERATING MOTION FORECAST DATA FOR ACTORS WITH RESPECT TO AN AUTONOMOUS VEHICLE AND TRAINING A MACHINE LEARNED MODEL FOR THE SAME

(71) Applicant: UATC, LLC, San Francisco, CA (US)

(72) Inventors: Raquel Urtasun, Toronto (CA); Renjie Liao, Toronto (CA); Sergio Casas, Toronto (CA); Cole Christian Gulino, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 486 days.

(21) Appl. No.: 16/816,671

(22) Filed: Mar. 12, 2020

(65) Prior Publication Data
US 2021/0009163 A1    Jan. 14, 2021

Related U.S. Application Data

(60) Provisional application No. 62/926,826, filed on Oct. 28, 2019, provisional application No. 62/871,452, filed on Jul. 8, 2019.

(51) Int. Cl.
*G06N 3/04*    (2006.01)
*G06N 3/08*    (2006.01)
(Continued)

(52) U.S. Cl.
CPC ........... *G06N 3/04* (2013.01); *G01C 21/3626* (2013.01); *G06N 3/0454* (2013.01); *G06N 3/06* (2013.01);
(Continued)

(58) Field of Classification Search
CPC .. G01C 21/3811; G01C 21/3626; G06N 3/04; G06N 3/0454; G06N 3/06; G06N 3/08;
(Continued)

(56) References Cited

U.S. PATENT DOCUMENTS 6,366,701 B1 *  4/2002  Chalom ................ G06F 16/786
                                                    382/107
9,248,834 B1 *  2/2016  Ferguson .......... B60W 60/0027
(Continued)

OTHER PUBLICATIONS

Alahi et al., "Social LSTM: Human Trajectory Prediction in Crowded Spaces", IEEE/Computer Society Conference on Computer Vision and Pattern Recognition (CVPR 2016), Jun. 26-Jul. 1, 2016, Las Vegas, NV, 11 pages.
(Continued)

*Primary Examiner* — Babar Sarwar
(74) *Attorney, Agent, or Firm* — Dority & Manning, P.A.

(57) ABSTRACT

Systems and methods for generating motion forecast data for actors with respect to an autonomous vehicle and training a machine learned model for the same are disclosed. The computing system can include an object detection model and a graph neural network including a plurality of nodes and a plurality of edges. The computing system can be configured to input sensor data into the object detection model; receive object detection data describing the location of the plurality of the actors relative to the autonomous vehicle as an output of the object detection model; input the object detection data into the graph neural network; iteratively update a plurality of node states respectively associated with the plurality of nodes; and receive, as an output of the graph neural network, the motion forecast data with respect to the plurality of actors.

20 Claims, 7 Drawing Sheets

(51) Int. Cl.
| | |
|---|---|
| G08G 1/00 | (2006.01) |
| G01C 21/36 | (2006.01) |
| G08G 1/01 | (2006.01) |
| G06N 7/00 | (2006.01) |
| G06N 7/04 | (2006.01) |
| G06N 3/06 | (2006.01) |
| G06N 3/084 | (2023.01) |

(52) U.S. Cl.
CPC ............... *G06N 3/08* (2013.01); *G06N 3/084* (2013.01); *G06N 7/005* (2013.01); *G06N 7/046* (2013.01); *G08G 1/0133* (2013.01); *G08G 1/0141* (2013.01); *G08G 1/20* (2013.01)

(58) Field of Classification Search
CPC ........ G06N 3/084; G06N 7/005; G06N 7/046; G08G 1/0112; G08G 1/0133; G08G 1/0141; G08G 1/096775; G08G 1/20
See application file for complete search history.

(56) References Cited

U.S. PATENT DOCUMENTS

| | | | | |
|---|---|---|---|---|
| 10,127,465 | B2* | 11/2018 | Cohen | G01C 21/34 |
| 11,112,796 | B2* | 9/2021 | Djuric | G05D 1/0088 |
| 2017/0131719 | A1* | 5/2017 | Micks | G06V 20/584 |
| 2018/0074505 | A1* | 3/2018 | Lv | G05D 1/0246 |
| 2019/0049970 | A1* | 2/2019 | Djuric | B60W 60/00276 |
| 2019/0152490 | A1* | 5/2019 | Lan | B60W 50/0097 |
| 2020/0139960 | A1* | 5/2020 | Newman | B60W 10/04 |
| 2020/0159225 | A1* | 5/2020 | Zeng | G01C 21/3453 |
| 2021/0090447 | A1* | 3/2021 | Gnoth | B64F 1/36 |
| 2021/0146963 | A1* | 5/2021 | Li | B60W 60/00272 |
| 2021/0332766 | A1* | 10/2021 | Hareyama | F02D 41/021 |

OTHER PUBLICATIONS

Bansal et al., "ChauffeurNet: Learning to Drive by Imitating the Best and Synthesizing the Worst", arXiv: 1812.03079v1, Dec. 7, 2018, 20 Pages.
Bickson, "Gaussian Belief Propagation: Theory and Application", arXiv:0811.2518v1, Nov. 15, 2008, 86 pages.
Brown, "Iterative Solutions Of Games By Fictitious Play", Activity Analysis of Production and Allocation, vol. 13, No. 1, 1951, pp. 374-376.
Casas et al., "IntentNet: Learning to Predict Intention from Raw Sensor Data", Conference on Robot Learning (CoRL 2018), Oct. 29-31, 2018, Zurich, Switzerland, 10 pages.
Chen et al, "Multi-View 3D Object Detection Network for Autonomous Driving", IEEE Computer Society Conference on Computer Vision and Pattern Recognition (CVPR 2017), Jul. 21-26, 2017, Honolulu, HI, pp. 1907-1915.
Chen et al., "3D Object Proposals for Accurate Object Class Detection", NIPS 2015, Dec. 7-12, 2015, Montreal, Canada, 9 pages.
Chen et al., "Monocular 3D Object Detection for Autonomous Driving", IEEE/Computer Society Conference on Computer Vision and Pattern Recognition (CVPR 2016), Jun. 26-Jul. 1, 2016, Las Vegas, NV, pp. 2147-2156.
Chou et al., "Predicting Motion of Vulnerable Road Users using High-Definition Maps and Efficient ConvNets", arXiv:1906.08469v1, Jun. 20, 2019, 9 pages.
Connolly et al., "Some Contagion Models of Speeding", Accident Analysis & Prevention, vol. 25, Issue 1, Feb. 1993, pp. 57-66.
Cosgun et al., "Towards Full Automated Drive in Urban Environments: A Demonstration in GoMentum Station, California", arXiv:1705.01187v1, May 2, 2017, 8 pages.
Cui et al., "Multimodal Trajectory Predictions for Autonomous Driving using Deep Convolutional Networks", arXiv:1809.10732v2, Mar. 1, 2019, 7 pages.

Cui et al., "Multimodal Trajectory Predictions for Autonomous Driving using Deep Convolutional Networks", arXiv:1809.10732v1, Sep. 18, 2018, 7 pages.
Deng et al., "ImageNet: A Large-Scale Hierarchical Image Database", IEE Computer Society Conference on Computer Vision and Pattern Recognition (CVPR 2009), Jun. 20-25, 2009, Miami, FL, pp. 1-8.
Deo et al., "Convolutional Social Pooling for Vehicle Trajectory Prediction", IEEE/CVF Conference on Computer Vision and Pattern Recognition (CVPR 2018), Jun. 18-22, 2018, Salt Lake City, Utah, 9 pages.
Djuric et al., "Motion Prediction of Traffic Actors for Autonomous Driving using Deep Convolutional Networks", arXiv:1808.05819v2, Sep. 16, 2018, 7 pages.
Engelcke et al., "Vote3Deep: Fast Object Detection in 3D Point Clouds Using Efficient Convolutional Neural Networks", arXiv:1609.06666v2, Mar. 5, 2017, 7 pages.
Girshick, "Fast R-CNN", 2015 IEEE International Conference on Computer Vision (ICCV), Dec. 7-13, 2015, Santiago, Chile, pp. 1440-1448.
Gupta et al., "Social GAN: Socially Acceptable Trajectories with Generative Adversarial Networks", IEEE/CVF Conference on Computer Vision and Pattern Recognition (CVPR 2018), Jun. 18-22, 2018, Salt Lake City, Utah, pp. 2255-2264.
He et al., "Deep Residual Learning for Image Recognition", IEEE/Computer Society Conference on Computer Vision and Pattern Recognition (CVPR 2016), Jun. 26-Jul. 1, 2016, Las Vegas, NV, pp. 770-778.
He et al., "Mask R-CNN", 2017 IEEE International Conference on Computer Vision (ICCV), Oct. 22-29, 2017, Venice, Italy, pp. 2961-2969.
Hu et al., "Probabilistic Prediction of Vehicle Semantic Intention and Motion", arXiv:1804.03629v1, Apr. 10, 2018, 7 pages.
Kim et al., "Probabilistic Vehicle Trajectory Prediction Over Occupancy Grid Map via Recurrent Neural Network", arXiv:1704.02049v2, Sep. 1, 2017, 6 pages.
Kingma et al., "Adam: A Method for a Stochastic Optimization", arXiv:1412.6980v8, Jul. 23, 2015, 15 pages.
Kipf et al., "Neural Relational Inference for Interacting Systems", arXiv:1802.04687v2, Jun. 6, 2018, 17 pages.
Ku et al., "Joint 3D Proposal Generation and Object Detection from View Aggregation", arXiv:1712.02294v4, Jul. 12, 2018, 8 pages.
Lee et al., "DESIRE: Distant Future Prediction in Dynamic Scenes with Interacting Agents", IEEE Computer Society Conference on Computer Vision and Pattern Recognition (CVPR 2017), Jul. 21-26, 2017, Honolulu, HI, pp. 336-345.
Li et al., "Situation Recognition with Graph Neural Networks", 2017 IEEE International Conference on Computer Vision (ICCV), Oct. 22-29, 2017, Venice, Italy, pp. 4173-4182.
Li et al., "Stereo R-CNN based 3D Object Detection for Autonomous Driving", IEEE/CVF Conference on Computer Vision and Pattern Recognition (CVPR 2019), Jun. 16-20, 2019, Long Beach, CA, pp. 7644-7652.
Li et al., "Vehicle Detection from 3D Lidar Using Fully Convolutional Network", arXiv:1608.07916v1, Aug. 29, 2016, 8 pages.
Li, "3D Fully Convolutional Network for Vehicle Detection in Point Cloud", arXiv:1611.08069v2, Jan. 16, 2017, 5 pages.
Liang et al., "Deep Continuous Fusion for Multi-Sensor 3D Object Detection", European Conference on Computer Vision, Sep. 8-14, 2018, Munich, Germany, 16 pages.
Liang et al., "Multi-Task Multi-Sensor Fusion for 3D Object Detection", IEEE/CVF Conference on Computer Vision and Pattern Recognition (CVPR 2019), Jun. 16-20, 2019 Long Beach, CA, pp. 7345-7353.
Lin et al., "Focal Loss for Dense Object Detection", IEEE Computer Society Conference on Computer Vision and Pattern Recognition (CVPR 2017), Jul. 21-26, 2017, Honolulu, HI, pp. 2980-2988.
Lin et al., "Feature Pyramid Networks for Object Detection", IEEE Computer Society Conference on Computer Vision and Pattern Recognition (CVPR 2017), Jul. 21-26, 2017, Honolulu, HI, pp. 2117-2125.
Luo et al., "Fast and Furious: Real Time End-to-End 3d Detection, Tracking and Motion Forecasting With a Single Convolutional

(56) References Cited

OTHER PUBLICATIONS

Net", IEEE Computer Society Conference on Computer Vision and Pattern Recognition, Jun. 18-22, 2018, Salt Lake City, Utah, 9 pages.
Ma et al., "Arbitrary-Oriented Scene Text Detection via Rotation Proposals", arXvi:1703.01086v3, Mar. 15, 2008, 11 pages.
Ma et al., "Forecasting Interactive Dynamics of Pedestrians With Fictitious Play", IEEE Computer Society Conference on Computer Vision and Pattern Recognition, Jul. 21-26, 2017, Honolulu, HI, 9 pages.
Ma et al., "TraffrcPredict: Trajectory Prediction for Heterogeneous Traffic-Agents", The Thirty-Third AAAI Conference on Artificial Intelligence (AAAI-19), Jan. 27-Feb. 1, 2019, Honolulu, HI, pp. 6120-6127.
McNabb et al., "I'll Show You the Way: Risky Diver Behavior When "Following a Friend"." Frontiers in Psychology, vol. 8, Article 705, May 9, 2017, 6 pages.
Meyer et al., "LaserNet: An Efficient Probabilistic 3D Object Detector for Autonomous Driving", IEEE/CVF Conference on Computer Vision and Pattern Recognition (CVPR 2019), Jun. 16-20, 2019 Long Beach, CA, pp. 12677-12686.
Meyer et al., "Sensor Fusion for Joint 3D Object Detection and Semantic Segmentation", IEEE/CVF Conference on Computer Vision and Pattern Recognition (CVPR 2019), Jun. 16-20, 2019 Long Beach, CA, pp. 41-48.
Qi et al., "3D Graph Neural Networks for RGBD Semantic Segmentation", 2017 IEEE International Conference on Computer Vision (ICCV), Oct. 22-29, 2017, Venice, Italy, pp. 5199-5208.
Qi et al., "Frustum PointNets for 3D Object Detection from RGB-D Data", IEEE/CVF Conference on Computer Vision and Pattern Recognition (CVPR 2018), Jun. 18-22, 2018, Salt Lake City, Utah, pp. 918-927.
Qi et al., "PointNet: Deep Learning on Point Sets for 3D Classification and Segmentation", IEEE Computer Society Conference on Computer Vision and Pattern Recognition (CVPR 2017), Jul. 21-26, 2017, Honolulu, HI, pp. 652-660.
Qi et al., "PointNet++: Deep Hierarchical Feature Learning on Point Sets in Metric Space", $31^{st}$ Conference on Neural Information Processing Systems, Dec. 4-9, 2017, Long Beach, CA, 10 pages.
Sadeghian et al., "SoPhie: An Attentive GAN for Predicting Paths Compliant to Social and Physical Constraints", IEEE/CVF Conference on Computer Vision and Pattern Recognition (CVPR 2019), Jun. 16-20, 2019, Long Beach, CA, pp. 1349-1358.
Santoro et al., "A simple neural network module for relational reasoning", $31^{st}$ Conference on Neural Information Processing Systems, Dec. 4-9, 2017, Long Beach, CA, pp. 273-283.
Scarselli et al., "The graph neural network", IEEE Transactions on Neural Networks, vol. 20, No. 1, Jan. 2009, pp. 59-80.
Schlichtkrull et al., "Modeling Relational Data with Graph Convolutional Networks", arXiv:1703.06103v4, Oct. 26, 2017, 9 pages.
Shi et al., "PointRCNN: 3D Object Proposal Generation and Detection from Point Cloud", IEEE/CVF Conference on Computer Vision and Pattern Recognition (CVPR 2019), Jun. 16-20, 2019 Long Beach, CA, pp. 770-779.
Simon et al., "Complex-YOLO: An Euler-Region-Proposal for Real-time 3D Object Detection on Point Clouds", arXiv:1803.06199v2, Sep. 24, 2018, 14 pages.
Simonyan et al., "Very Deep Convolutional Networks for Large-Scale Image Recognition", arXiv:1409.1556v5, Dec. 23, 2014, 13 pages.
Soo Park et al., "Egocentric Future Localization" IEEE/Computer Society Conference on Computer Vision and Pattern Recognition (CVPR 2016), Jun. 26-Jul. 1, 2016, Las Vegas, NV, pp. 4697-4705.
Sun et al., "Actor-Centric Relation Network", European Conference on Computer Vision, Sep. 8-14, 2018, Munich, Germany, 17 pages.
Sun et al., "Courteous Autonomous Cars", arXiv:1808.02633, Aug. 16, 2018, 9 pages.
Sun et al., "Relational Action Forecasting", IEEE/CVF Conference on Computer Vision and Pattern Recognition (CVPR 2019), Jun. 16-20, 2019, Long Beach, CA, pp. 273-283 pages.
Vaswani et al., "Attention Is All You Need", $31^{st}$ Conference on Neural Information Processing Systems, Dec. 4-9, 2017, Long Beach, CA, 15 pages.
Wang et al., "Deep Parametric Continuous Convolutional Neural Networks", IEEE/CVF Conference on Computer Vision and Pattern Recognition (CVPR 2018), Jun. 18-22, 2018, Salt Lake City, Utah, pp. 2589-2597.
Weiss et al., "Correctness of belief propagation in Gaussian graphical models of arbitrary topology", Neural Information Processing Systems 2000, Nov. 27-Dec. 2, 2000, Denver, CO, pp. 673-679.
Wilde, "Social Interaction Patterns in Driver Behavior: An Introductory Review" Human Factors: The Journal of the Human Factors and Ergonomics Society, vol. 11, No. 5, Oct. 1976, pp. 477-492.
Yang et al., "HDNET: Exploiting HD Maps for 3D Object Detection", $2^{nd}$ Conference on Robot Learning, Oct. 29-31, 2018, Zurich, Switzerland, 10 pages.
Yang et al., "PIXOR: Real-Time 3D Object Detection From Point Clouds", IEEE/CVF Conference on Computer Vision and Pattern Recognition (CVPR 2018), Jun. 18-22, 2018 Salt Lake City, Utah, pp. 7652-7660.
Yi et al., "Pedestrian Behavior Understanding and Prediction with Deep Neural Networks", European Conference on Computer Vision, Oct. 8-16, 2016, Amsterdam, The Netherlands, pp. 263-279.
Zeng et al., "End-to-end Interpretable Neural Motion Planner", IEEE/CVF Conference on Computer Vision and Pattern Recognition (CVPR 2019), Jun. 16-20, 2019, Long Beach, CA, 10 pages.
Zhou et al., "VoxelNet: End-to-End Learning for Point Cloud Based 3D Object Detection", IEEE/CVF Conference on Computer Vision and Pattern Recognition (CVPR 2018), Jun. 18-22, 2018, Salt Lake City, Utah, 10 pages.
Ziegler et al., "Making Bertha Drive—An Autonomous Journey on a Historic Route", IEEE Intelligent Transportation Systems Magazine, vol. 6, No. 2, 2014, pp. 8-20.

* cited by examiner

SYSTEMS AND METHODS FOR GENERATING MOTION FORECAST DATA FOR ACTORS WITH RESPECT TO AN AUTONOMOUS VEHICLE AND TRAINING A MACHINE LEARNED MODEL FOR THE SAME

CROSS REFERENCE TO RELATED APPLICATION

The present application claims filing benefit of U.S. Provisional Patent Application Ser. No. 62/871,452 having a filing date of Jul. 8, 2019, which is incorporated herein by reference in its entirety, claims filing benefit of U.S. Provisional Patent Application Ser. No. 62/926,826 having a filing date of Oct. 28, 2019, which is incorporated herein by reference in its entirety.

FIELD

The present disclosure relates generally to controlling vehicles. In particular, the present disclosure is directed to systems and methods for generating motion forecast data for actors with respect to an autonomous vehicle and training a machine learned model for the same

BACKGROUND

Autonomous vehicles can be capable of sensing their environments and navigating with little to no human input. In particular, an autonomous vehicle can observe its surrounding environment using a variety of sensors and can attempt to comprehend the environment by performing various processing techniques on data collected by the sensors. Some vehicles can predict or project future circumstances based on current observations. However, the interactions between various third party actors can be complex and difficult to model.

SUMMARY

Aspects and advantages of embodiments of the present disclosure will be set forth in part in the following description, or may be learned from the description, or may be learned through practice of the embodiments.

Aspects of the present disclosure are directed to a computing system including an object detection model configured to receive sensor data, and in response to receipt of the sensor data, generate object detection data describing locations of a plurality of actors relative to an autonomous vehicle. The computing system can include a graph neural network comprising a plurality of nodes and a plurality of edges. The graph neural network can be configured to receive the object detection data, and in response to receipt of the object detection data, output motion forecast data with respect to the plurality of actors. The computing system can include a memory that stores a set of instructions and one or more processors which use the set of instructions to input sensor data into one or more object detection models and receive, as an output of the one or more object detection models, the object detection data describing the locations of the plurality of the actors relative to the autonomous vehicle; input the object detection data into the graph neural network; iteratively update a plurality of node states respectively associated with the plurality of nodes; and receive, as an output of the graph neural network, the motion forecast data with respect to the plurality of actors.

Another aspect of the present disclosure is directed to a computer-implemented method for forecasting actor motion data. The method can include inputting, by a computing system comprising one or more computing devices, sensor data into one or more object detection models configured to receive sensor data, and in response to receipt of the sensor data, generate object detection data describing locations of a plurality of actors relative to an autonomous vehicle. The method can include receiving, by the computing system and as an output of the one or more object detection models. The object detection data can describe the location of the plurality of the actors relative to the autonomous vehicle. The method can include inputting, by the computing system, the object detection data into a graph neural network comprising a plurality of nodes and a plurality of edges. The graph neural network can be configured to receive the object detection data, and in response to receipt of the object detection data, output motion forecast data with respect to the plurality of actors. The method can include iteratively updating, by the computing system, a plurality of node states respectively associated with the plurality of nodes. The method can include receiving, by the computing system and as an output of the graph neural network, the motion forecast data with respect to the plurality of actors.

Another aspect of the present disclosure is directed to a computer-implemented method for training a graph neural network for generating actor motion forecast data. The method can include inputting, by a computing system comprising one or more computing devices, sensor data into one or more object detection models configured to receive the sensor data, and in response to receipt of the sensor data, output object detection data describing locations of a plurality of actors relative to an autonomous vehicle. The method can include receiving, by the computing system and as an output of the one or more object detection models. The object detection data can describe the location of the plurality of the actors relative to the autonomous vehicle. The method can include inputting, by the computing system, the object detection data into a graph neural network comprising a plurality of nodes and a plurality of edges. The graph neural network can be configured to receive the object detection data, and in response to receipt of the object detection data, output motion forecast data with respect to the plurality of actors. The method can include iteratively updating, by the computing system, a plurality of node states respectively associated with the plurality of nodes. The method can include receiving, by the computing devices and as an output of the graph neural network, the motion forecast data with respect to the plurality of actors. The method can include adjusting, by the computing system, at least one parameter of the graph neural network based on a comparison of the motion forecast data with respect to ground truth motion forecast data.

Other example aspects of the present disclosure are directed to systems, methods, vehicles, apparatuses, tangible, non-transitory computer-readable media, and memory devices for controlling autonomous vehicles.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
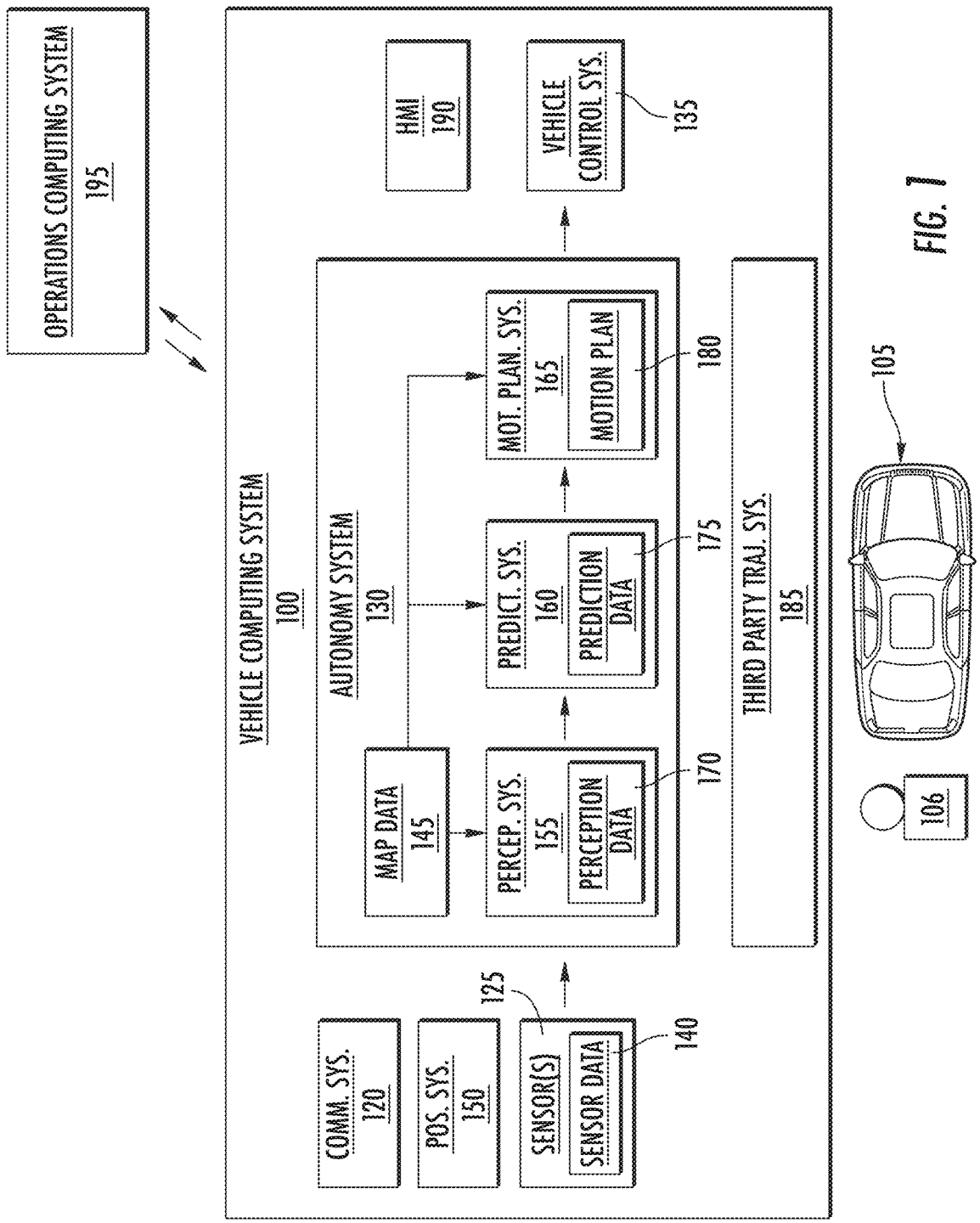
FIG. 1 depicts an example system overview according to example implementations of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to systems and methods for generating motion forecast data for a plurality of actors with respect to an autonomous vehicle. Interaction between third party actors, such as vehicles, pedestrians, cyclists, and the like can alter how such third parties act. An actor can change its trajectory based on how it predicts another actor will act (e.g., its trajectory). For instance, when multiple vehicles approach a four-way stop, drivers anticipate how each will act to determine when to yield. Similarly, when one vehicle begins changing lanes, other drivers typically project a future trajectory of the vehicle. Other drivers can adjust their own trajectories based on this projection of the vehicles trajectory to prevent unsafe conditions, such as becoming dangerously close with the vehicle. Aspects of the present disclosure are directed to providing systems and method for autonomous vehicles that project third party trajectories of other actors based on anticipated interactions between the actors. Autonomous vehicles can greatly benefit from such systems to better navigate through and integrate into the modern driving environment (e.g., including human-driven vehicles and/or semi-autonomous vehicles).

A machine learned model, including a graph neural network, can be leveraged to predict the future states of detected actors in a manner that models interactions between the actors. A probabilistic formulation can be employed in which respective trajectories of each actor can be predicted in a relational fashion with respect to each actor's nearby actors. As the number of vehicles in the scene is typically not large (typically less than a hundred), a fully connected directed graph neural network can be used. The model can determine the importance of the interplay for each pair of actors in a bidirectional fashion. Note that the relationships can be asymmetric (e.g., an actor slowing with adaptive cruise control in response to a vehicle in front of the actor). Further the graph neural network can be described as "spatially aware," by being particularly adapted for modeling the spatial relationships and resulting interactions between third party actors. Thus, the present systems can leverage "spatially aware" graph neural networks to predict and model third party actors including interactions between such actors.

More particularly, an autonomous vehicle can be a ground-based autonomous vehicle (e.g., car, truck, bus, bike, scooter, etc.) or another type of vehicle (e.g., aerial vehicle, etc.) that can operate with minimal and/or no interaction from a human operator. An autonomous vehicle can include a vehicle computing system located onboard the autonomous vehicle to help control the autonomous vehicle. The vehicle computing system can be located onboard the autonomous vehicle, in that the vehicle computing system can be located on or within the autonomous vehicle. The vehicle computing system can include one or more sensors, an autonomy computing system (e.g., for determining autonomous navigation), one or more vehicle control systems (e.g., for controlling braking, steering, powertrain, etc.), and/or other systems. The vehicle computing system can obtain sensor data from sensor(s) onboard the vehicle, attempt to comprehend the vehicle's surrounding environment by performing various processing techniques on the sensor data, and generate an appropriate motion plan through the vehicle's surrounding environment.

The vehicle computing system can receive sensor data from one or more sensors that are coupled to or otherwise included within the autonomous vehicle. For example, in some implementations, a perception system can be included within the vehicle computing system and configured to receive the sensor data. As examples, the one or more sensors can include a Light Detection and Ranging (LIDAR) system, a Radio Detection and Ranging (RADAR) system, one or more cameras (e.g., visible spectrum cameras, infrared cameras, etc.), a positioning system (e.g., GPS), and/or other sensors. The sensor data can include information that describes the location of static objects and/or dynamic objects (actors) within the surrounding environment of the autonomous vehicle. For example, the objects can include traffic signals, additional vehicles, pedestrians, bicyclists, signs (e.g., stop signs, yield signs), and/or other objects. The sensor data can include raw sensor data and/or data that has been processed or manipulated in some manner before being provided to other systems within the vehicle's autonomy computing system.

In addition to the sensor data, the vehicle computing system (e.g., a perception system) can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, and/or instructions of signage (e.g., stop signs, yield signs), traffic lights (e.g., stop lights), or other traffic signals or control devices/markings (e.g., cross walks)); and/or any other map data that provides information that assists the vehicle computing system in comprehending and perceiving its surrounding environment and its relationship thereto.

To help forecast data for objects/actors with respect to an autonomous vehicle, the systems and methods described herein can leverage various machine-learned models, including one or more object detection models. The sensor data can be processed (e.g., voxelized) and input into the object detection model(s). Object detection data can be received as an output of the object detection model(s) that describes locations of a plurality of actors relative to an autonomous vehicle. The object detection data can include bounding boxes, regions of interest, or the like identifying the locations, headings, etc. of the actors.

In some implementations, multiple object detection models can be leveraged to perform object recognition with respect to input data that includes sensor data and map data (e.g., as a "two stream" system). The map data can include data describing locations of roads, lanes, intersections, crossings, traffic signs, traffic lights, and so forth (e.g., raster maps). More specifically, sensor data can be input into a first machine learned model. Sensor object recognition data can be received as an output of the first machine learned model. Map data can be input into a second machine learned model and map analysis data can be received as an output of the second machine learned model. The sensor object recognition data and map analysis data can be concatenated (e.g., along a channel dimension) and input into a header neural network. Intermediate object detection data can be received as an output of the header neural network. The intermediate object detection data can describe the locations of a plurality of actors. For example, the intermediate object detection data can include bounding box parameters, anchor locations, and/or associated confidence scores. In some implementations, additional neural networks can be used to produce anchor scores and/or anchor boxes describing locations of the plurality of actors and/or regions of interest with respect to the plurality of actors. The anchor scores and anchor boxes can be combined and redundant boxes can be reduced or eliminated by applying non-maximum suppression (NMS) to generate processed object detection data.

The object detection data can be input into a graph neural network that includes a plurality of nodes and a plurality of edges. The nodes of the graph neural network can represent other actors, and the edges can represent interactions between the actors. As indicated above, the graph neural network can be fully connected such that each node is connected with every other node. However, in some implementations, the graph neural network can be partially connected, for example, when modeling a large number of actors.

As indicated above the graph neural network can be described as "spatially aware." For example, messages can be passed between the nodes in a manner that captures spatial relationships between the actors such that interactions between the nodes can be better modeled. Messages can passed between the nodes (e.g., along the edges of the GNN) to update respective node states of the nodes. The node states can represent or describe the respective nodes' future trajectories based on their "perception" of the other actors. Such messages can be transposed into a frame of reference of the node receiving the message and/or can describe relative distances between the nodes. For example, the messages passed between nodes can be transformed into respective local coordinate systems of the respective nodes that are receiving the messages. The respective messages can include data describing relative locations and/or relative trajectories of the other nodes with respect to the receiving node of the plurality of nodes. For each respective node of the plurality of nodes, the plurality of respective messages from each other node can be aggregated to update the respective node. The graph neural network can generate data that describes trajectories of the third party actors in light of interactions between the actors. As such, the graph neural network can better model interactions between actors and can be described as "spatially aware."

In some implementations, the nodes can have respective hidden node states and output node states. The output node states can be shared, while the hidden node states may not be shared between the nodes. The hidden node states can include or describe the node trajectory or plan. The output node state can include or describe "observable" features (e.g., velocity, location, heading, etc.) of the node (e.g., representing an actor within a vehicle's environment). The hidden node state can be updated as described above based on the received messages (e.g., describing "observable" features of other actors).

As an example, for the v-th node, the initial hidden state can be constructed by extracting the region of interest (RoI) feature map from the detection backbone network for the v-th detection. In particular, "Rotated RoI Align," an improved variant of the RoI pooling and RoI align models, can be used to extract fixed-size spatial feature maps for bounding boxes with arbitrary shapes and rotations. A down-sampling convolutional network (e.g., having four layers) followed by max pooling can be used to reduce the 2D feature map to a 1D feature vector per actor. The output state at each message passing step can include statistics of the marginal distribution. Specifically, the marginal of each waypoint and angle cab be assigned to follow a Gaussian and Von Mises distributions, respectively. Therefore, the predicted output state can be the concatenation of the parameters of both distributions. The output states in the GNN can be gradually improved as the message passing algorithm continues. Note that the likelihood can be evaluated using the local coordinate system centered at each actor and oriented such that the x-axis is aligned with a heading direction of the respective actor. This can make the learning task easier compared to using a global anchor coordinate system. To initialize the output state, a multi-layer perceptron (MLP) can be employed which can receives the max-pooled ROI features as an input and directly output or predicts the output state, independently per actor.

In some implementations, message passing can be repeated for a pre-determined number of times. The number of times can be set as a hyperparameter of the system. As indicated above, the messages can then be aggregated at each node to update the respective node state. For example, one or more gated recurrent unit (GRU) cells and/or multi-layer perceptrons (MLPs) can be used to aggregate and/or update the node states. However, in other implementations, message passing can be performed until one or more criteria is satisfied (e.g., with respect to the messages and/or node states).

In some implementations, MLPs can be leveraged included in one or more machine learned models of the systems described herein. As indicated above, an MLP can be used to aggregate and/or update the note states. For instance, the "edges" of the graph neural network can be modeled as one or more MLPs. As another example, one or more MLPs can be used to generate output nodes states based on the object detection data received from the object detection model. Thus, MLPs can be included in one or more machine-learned models described herein.

Aspects of the present disclosure are directed to training a third party trajectory system including a graph neural network for generating motion forecast data for a plurality of actors with respect to an autonomous vehicle. For example, motion forecast data output by the graph neural network and/or the trajectory prediction model(s) including the graph neural network can be compared with ground truth motion forecast data. One or more parameters of the graph neural network can be updated based on the comparison. For example, a loss function that describes the comparison of the motion forecast data with respect to ground truth motion forecast data can be evaluated. The parameter(s) of the object detection model and/or graph neural network can be adjusted based on the evaluation of the loss function.

In some implementations, multiple models (e.g., including object detection model(s) and the graph neural network) can be trained jointly end-to-end. Errors can be sequentially back-propagated through the graph neural network and the object detection model to determine a gradient of a loss function. Parameters of one or both of the graph neural network and the object detection model can be adjusted based on the gradient of the loss function. For example, a multi-task objective can be initiated that contains a binary cross entropy loss for the classification branch of the detection network (background vs. vehicle), a regression loss to fit the detection bounding boxes and a negative log likelihood (NLL) term for the probabilistic trajectory prediction. Hard negative mining can be applied to the classification loss. For example, all positive examples can be selected from the ground-truth, and the times as many negative examples from the rest of anchors. Regarding box fitting, a smooth L1 loss can be applied to each of the parameters of the bounding boxes and anchored to a positive example. For the message passing of GNN, back propagation through time can be used to pass the gradient to the detection backbone network.

Example aspects of the present disclosure can provide for a number of technical effects and benefits, including improvements to computing systems. For example, the computational time and resources required to accurately predict the trajectories of the third party actors can be reduced. Another example technical effect and benefit can include an improved safety assurance. In some cases, especially cases involving multiple actors and/or decisions, exhaustively testing every possibility can be computationally infeasible. Systems and methods according to the present disclosure can allow for an autonomous vehicle to safely navigate scenes having multiple objects and/or requiring multiple decisions that could otherwise be challenging or impossible to navigate effectively while considering the safety of each object and/or decision.

More specifically, leveraging a graph neural network as described herein can provide reduce computational resources required to accurately predict motion forecast data (e.g., trajectories) of the third party actors. Actors can be modeled as nodes, and messages can be passed between the nodes to update node state that can describe the actors' perceptions of each other. Iteratively updating nodes states as described herein can efficiently and accurately model interactions between actors such that computing resources are more efficiently used and/or predictions are more quickly generated. More rapidly generating such motion forecast data for the third party actors can improve safety by allowing the autonomous vehicle to more quickly anticipate how interactions between other actors (e.g., drivers) will cause the drivers to act in response when a circumstances change rapidly (e.g., a car pulls into traffic in front of a car that is traveling in front of the autonomous vehicle).

Various means can be configured to perform the methods and processes described herein. For example, a computing system can include sensor data obtaining unit(s), map data obtaining unit(s), machine-learned object recognition model application unit(s), trajectory/behavior forecasting unit(s), vehicle controlling unit(s), operator communication unit(s), data storing unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain sensor data from one or more sensors that generate sensor data relative to an autonomous vehicle. In some implementations, the means can be configured to obtain sensor data associated with the autonomous vehicle's surrounding environment as well as the position and movement of the autonomous vehicle. In some implementations, the means can be configured to obtain LIDAR data (e.g., a three-dimensional point cloud) obtained from a LIDAR system. In some implementations, the means can be configured to obtain image data obtained from one or more cameras. In some implementations, the means can be configured to obtain a birds-eye view representation of data obtained relative to the autonomous vehicle. In some implementations, the means can be configured to obtain sensor data represented as a multi-dimensional tensor having a height dimension and a time dimension stacked into a channel dimension associated with the multi-dimensional tensor. A sensor data obtaining unit is one example of a means for obtaining such sensor data as described herein.

The means can be configured to access or otherwise obtain map data associated with a surrounding geographic environment of the autonomous vehicle. More particularly, in some implementations, the means can be configured to access or otherwise obtain map data that provides information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system in processing, analyzing, and perceiving its surrounding environment and its relationship thereto. In some implementations, the means can be configured to access or otherwise obtain map data that is provided in a birds-eye view representation, such as generated by rasterization or other suitable processing format. A map data obtaining unit is one example of a means for obtaining such map data as described herein.

The means can be configured to provide, as input to a machine-learned object detection model, the sensor data, and to receive the object detection data as an output of the machine-learned object detection. A machine learned object detection model unit is one example of a means for providing the sensor data and map data as inputs to the machine learned object detection model and receiving multiple outputs therefrom.

The means can be configured to generate motion forecast data that describes or predicts the trajectory/behavior of a plurality of actors with respect to the autonomous vehicle. The trajectory/behavior forecasting unit(s) is one example of a means for providing data output from the machine learned object detection model(s) to the trajectory prediction model(s) (e.g., including the graph neural network(s)) and receiving multiple outputs therefrom).

The means can be configured to determine a motion plan for the autonomous vehicle based at least in part on the motion forecast data. The means can be configured to determine a motion plan for the autonomous vehicle that best navigates the autonomous vehicle along a determined travel route relative to the objects at such locations. In some implementations, the means can be configured to determine a cost function for each of one or more candidate motion plans for the autonomous vehicle based at least in part on the current locations and/or predicted future locations and/or moving paths of the objects. A motion planning/control unit is one example of a means for determining a motion plan for the autonomous vehicle.

The means can be configured to control one or more vehicle controls (e.g., actuators or other devices that control gas flow, steering, braking, etc.) to execute the selected motion plan. A vehicle controlling unit is one example of a means for controlling motion of the autonomous vehicle to execute the motion plan.

With reference now to the FIGS., example aspects of the present disclosure will be discussed in further detail. FIG. 1 illustrates an example vehicle computing system 100 according to example embodiments of the present disclosure. The vehicle computing system 100 can be associated with a vehicle 105. The vehicle computing system 100 can be located onboard (e.g., included on and/or within) the vehicle 105.

The vehicle 105 incorporating the vehicle computing system 100 can be various types of vehicles. The vehicle 105 can be an autonomous vehicle. For instance, the vehicle 105 can be a ground-based autonomous vehicle such as an autonomous car, autonomous truck, autonomous bus, etc. The vehicle 105 can be an air-based autonomous vehicle (e.g., airplane, helicopter, or other aircraft) or other types of vehicles (e.g., watercraft, etc.). The vehicle 105 can drive, navigate, operate, etc. with minimal and/or no interaction from a human operator 106 (e.g., driver). An operator 106 (also referred to as a vehicle operator) can be included in the vehicle 105 and/or remote from the vehicle 105. In some implementations, the vehicle 105 can be a non-autonomous vehicle.

In some implementations, the vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a vehicle operator present in the vehicle 105 and/or remote from the vehicle 105). The vehicle 105 can operate in a semi-autonomous operating mode in which the vehicle 105 can operate with some input from a vehicle operator present in the vehicle 105 (and/or a human operator that is remote from the vehicle 105). The vehicle 105 can enter into a manual operating mode in which the vehicle 105 is fully controllable by a vehicle operator 106 (e.g., human driver, pilot, etc.) and can be prohibited and/or disabled (e.g., temporary, permanently, etc.) from performing autonomous navigation (e.g., autonomous driving). In some implementations, the vehicle 105 can implement vehicle operating assistance technology (e.g., collision mitigation system, power assist steering, etc.) while in the manual operating mode to help assist the vehicle operator of the vehicle 105. For example, a collision mitigation system can utilize a predicted intention of objects within the vehicle's 105 surrounding environment to assist an operator 106 in avoiding collisions and/or delays even when in manual mode.

The operating modes of the vehicle 105 can be stored in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 100 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. For example, in some implementations, the remote computing system can be an operations computing system 195, as disclosed herein. By way of example, such data communicated to a vehicle 105 by the operations computing system 195 can instruct the vehicle 105 to enter into the fully autonomous operating mode. In some implementations, the operating mode of the vehicle 105 can be set onboard and/or near the vehicle 105. For example, the vehicle computing system 100 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 100 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for determining object intentions based on physical attributes.

The vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the vehicle 105 over one or more networks (e.g., via one or more wireless signal connections). In some implementations, the communications system 120 can allow communication among one or more of the system(s) on-board the vehicle 105. The communications system 120 can include any suitable components for interfacing with one or more network(s), including, for example, transmitters, receivers, ports, controllers, antennas, and/or other suitable components that can help facilitate communication.

As shown in FIG. 1, the vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire sensor data 140. This can include sensor data associated with the surrounding environment of the vehicle 105. For instance, the sensor data 140 can include image and/or other data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 140 can include image data, radar data, LIDAR data, and/or other data acquired by the vehicle sensor(s) 125. The vehicle 105 can also include other sensors configured to acquire data associated with the vehicle 105. For example, the vehicle 105 can include inertial measurement unit(s), wheel odometry devices, and/or other sensors.

In some implementations, the sensor data 140 can be indicative of one or more objects within the surrounding environment of the vehicle 105. The object(s) can include, for example, vehicles, pedestrians, bicycles, and/or other objects. The object(s) can be located in front of, to the rear of, to the side of the vehicle 105, etc. The sensor data 140 can be indicative of locations associated with the object(s) within the surrounding environment of the vehicle 105 at one or more times. The vehicle sensor(s) 125 can provide the sensor data 140 to the autonomy computing system 130.

In addition to the sensor data 140, the autonomy computing system 130 can retrieve or otherwise obtain map data 145. The map data 145 can provide information about the surrounding environment of the vehicle 105. In some implementations, the vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 105 in comprehending and perceiving its surrounding environment and its relationship thereto. In some implementations, the vehicle computing system 100 can determine a vehicle route for the vehicle 105 based at least in part on the map data 145.

The vehicle 105 can include a positioning system 150. The positioning system 150 can determine a current position of the vehicle 105. The positioning system 150 can be any device or circuitry for analyzing the position of the vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 100 and/or provided to a remote computing system. For example, the map data 145 can provide the vehicle 105 relative positions of the elements of a surrounding environment of the vehicle 105. The vehicle 105 can identify its position within the surrounding environment (e.g., across six axes, etc.) based at least in part on the map data 145. For example, the vehicle computing system 100 can process the sensor data 140 (e.g., LIDAR data, camera data, etc.) to match it to a map of the surrounding environment to get an understanding of the vehicle's position within that environment.

The autonomy computing system 130 can include a perception system 155, a prediction system 160, a motion planning system 165, and/or other systems that cooperate to perceive the surrounding environment of the vehicle 105 and determine a motion plan for controlling the motion of the vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan through such surrounding environment. The autonomy computing system 130 can communicate with the one or more vehicle control systems 135 to operate the vehicle 105 according to the motion plan.

The vehicle computing system 100 (e.g., the autonomy computing system 130) can identify one or more objects that are proximate to the vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 155 can provide the perception data 170 to the prediction system 160, the motion planning system 165, the third party trajectory system 185, and/or other system(s).

The prediction system 160 can be configured to predict a motion of the object(s) within the surrounding environment of the vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. In some implementations, the prediction data 175 can include a predicted object intention (e.g., a right turn) based on physical attributes of the object. The prediction system 160 can output the prediction data 175 (e.g., indicative of one or more of the predicted motion trajectories) to the motion planning system 165.

The vehicle computing system 100 (e.g., the motion planning system 165) can determine a motion plan 180 for the vehicle 105 based at least in part on the perception data 170, the prediction data 175, and/or other data. A motion plan 180 can include vehicle actions (e.g., planned vehicle trajectories, speed(s), acceleration(s), intention, other actions, etc.) with respect to one or more of the objects within the surrounding environment of the vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the vehicle 105 (e.g., due to an overriding factor). In some implementations, the motion plan 180 may define the vehicle's motion such that the vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) for the vehicle 105 (e.g., multiple times per second). Each new motion plan can describe a motion of the vehicle 105 over the next planning period (e.g., next several seconds). Moreover, a new motion plan may include a new planned vehicle motion trajectory. Thus, in some implementations, the motion planning system 165 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 100 can cause the vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the vehicle 105. The vehicle control system(s) 135 can be associated with a vehicle controller (e.g., including a vehicle interface) that is configured to implement the motion plan 180. The vehicle controller can, for example, translate the motion plan into instructions for the appropriate vehicle control component (e.g., acceleration control, brake control, steering control, etc.). By way of example, the vehicle controller can translate a determined motion plan 180 into instructions to adjust the steering of the vehicle 105 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the vehicle 105 to autonomously travel within the vehicle's surrounding environment.

As shown in FIG. 1, the vehicle 105 can include an HMI ("Human Machine Interface") 190 that can output data and accept input from the operator 106 of the vehicle 105. For instance, the HMI 190 can include one or more output devices (e.g., speakers, display devices, tactile devices, etc.) such that, in some implementations, the HMI 190 can provide one or more informational prompts to the operator 106 of the vehicle 105. For example, the HMI 190 can be configured to provide prediction data 170 such as a predicted object intention to one or more vehicle operator(s) 106. Additionally, or alternatively, the HMI 190 can include one or more input devices (e.g., buttons, microphones, cameras, etc.) to accept vehicle operator 106 input. In this manner, the HMI 190 can communicate with the vehicle operator 106.

The vehicle computing system 100 can include a third party trajectory system 185. As illustrated in FIG. 1 the third party trajectory system 185 can be implemented onboard the vehicle 105 (e.g., as a portion of the vehicle computing system 100). Moreover, in some implementations, the third party trajectory system 185 can be remote from the vehicle 105 (e.g., as a portion of an operations computing system 195). The third party trajectory system 185 can determine one or more object intention(s) associated with objects within the surrounding environment of the vehicle 105, as described in greater detail herein. In some implementations, the third party trajectory system 185 can be configured to operate in conjunction with the vehicle autonomy system 130. For example, the third party trajectory system 185 can send data to and receive data from the vehicle autonomy system 130. In some implementations, the third party trajectory system 185 can be included in or otherwise a part of a vehicle autonomy system 130. The third party trajectory system 185 can include software and hardware configured to provide the functionality described herein. In some implementations, the third party trajectory system 185 can be implemented as a subsystem of a vehicle computing system 100. Additionally, or alternatively, the third party trajectory system 185 can be implemented via one or more computing devices that are remote from the vehicle 105. Example third party trajectory system 185 configurations according to example aspects of the present disclosure are discussed in greater detail with respect to FIGS. 2-6.

The operator 106 can be associated with the vehicle 105 to take manual control of the vehicle, if necessary. For instance, in a testing scenario, a vehicle 105 can be periodically tested with controlled faults that can be injected into an autonomous vehicle's autonomy system 130. This can help the vehicle's response to certain scenarios. A vehicle operator 106 can be located within the vehicle 105 and/or remote from the vehicle 105 to take control of the vehicle 105 (e.g., in the event the fault results in the vehicle exiting from a fully autonomous mode in the testing environment).

Although many examples are described herein with respect to autonomous vehicles, the disclosed technology is not limited to autonomous vehicles. For instance, any vehicle may utilize the technology described herein for determining object intention. For example, a non-autonomous vehicle may utilize aspects of the present disclosure to determine the intention of one or more objects (e.g., vehicles, bicycles, etc.) proximate to a non-autonomous vehicle. Such information may be utilized by a non-autonomous vehicle, for example, to provide informational notifications to an operator of the non-autonomous vehicle. For instance, the non-autonomous vehicle can notify or otherwise warn the operator of the non-autonomous vehicle based on a determined object intention. Additionally, or alternatively, the disclosed technology can be implemented and utilized by other computing systems such as other robotic computing systems.

Figure 2:
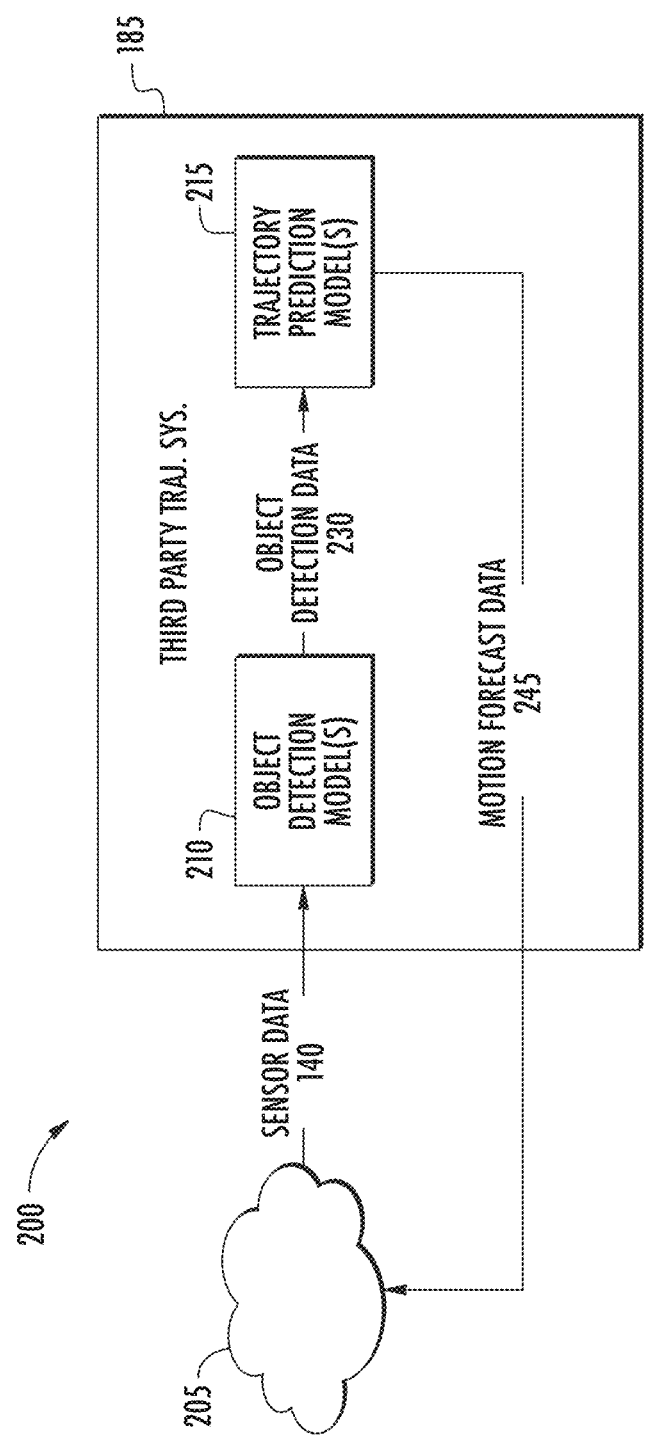
FIG. 2 depicts an example data flow diagram of an example third party trajectory system according to example implementations of the present disclosure.

FIG. 2 depicts an example data flow diagram 200 of an example third party trajectory system 185 according to example implementations of the present disclosure. To facilitate the determination of an object intention associated with an object of interest (e.g., a vehicle proximate to a first vehicle) the third party trajectory system 185 can obtain sensor data 140 via network 205. As described above with reference to FIG. 1, sensor data 140 can include any data associated with the surrounding environment of the vehicle 105 such as, for example, camera image data and/or Light Detection and Ranging (LIDAR) data. For example, in some implementations, the sensor data 140 can include a sequence of image frames at each of a plurality of time steps. For example, the sequence of image frames can be captured in forward-facing video on one or more platforms of vehicle 105.

In some implementations, the sensor data 140 can be captured via the one or sensor(s) 125 and transmitted to the third party trajectory system 185 via network 205. For example, the sensor(s) 125 can be communicatively connected to the third party trajectory system 185. In some implementations, the sensor data 140 can be captured by one or more remote computing devices (e.g., operation computing system 195) located remotely from the vehicle computing system 100. For example, the third party trajectory system 185 can be communicatively connected to one or more sensors associated with another vehicle and/or the operations computing system 195. In such a case, the third party trajectory system 185 can obtain the sensor data 140, via network 205, from the one or more remote computing devices and/or operations computing system 195.

The sensor data 140 can be associated with a surrounding environment of the vehicle 105. More particularly, the sensor data 140 can describe one or more objects of interest within the surrounding environment of the vehicle 105. The one or more object(s) of interest can include any moveable object within a threshold distance from the vehicle 105. In some implementations, the threshold distance can include a predetermined distance (e.g., the detection range of sensor(s) 125). Additionally, or alternatively, the third party trajectory system 185 can dynamically determine the threshold distance based on one or more factors such as weather, roadway conditions, environment, etc. For example, the one or more factor(s) can indicate a potentially hazardous situation (e.g., heavy rain, construction, etc.). In such a case, the third party trajectory system 185 can determine a larger threshold distance to increase safety.

In some implementations, the one or more object(s) of interest can include one or more vehicle(s) of interest. The vehicle(s) of interest can include, for example, any motorized object (e.g., motorcycles, automobiles, etc.). The vehicle(s) of interest (e.g., autonomous vehicles, non-autonomous vehicles, etc.) can be equipped with specific hardware to facilitate intent-related communication. For example, the one or more vehicle(s) of interest can include one or more signal light(s) (e.g., turn signals, hazard lights, etc.) to signal the vehicle's intention. The vehicle intention, for example, can include future actions such as lane changes, parking, and/or one or more turns. For instance, a vehicle can signal its intention to stay in a parked position by simultaneously toggling two turn signals on/off in a blinking pattern (e.g., by turning on its hazard lights). In other scenarios, a vehicle can signal its intention to turn by toggling a single turn signal on/off.

The third party trajectory system 185 can include one or more object detection models 210 that are configured to receive the sensor data 140, and in response to receipt of the sensor data 140, output object detection data 230 describing locations of a plurality of actors (e.g., vehicles, pedestrians, cyclists, etc.) relative to the autonomous vehicle 105 (FIG. 1). In some embodiments, the object detection models 210 can include models that are separate and distinct from other systems described above with reference to FIG. 1. However, it should be understood that the object detection model(s) 210 can be partially or completely included and/or integrated in one or more of the position system 150, perception system 115, prediction system 160, and/or motion planning system 165 described above with reference to FIG. 1.

The third party trajectory system 185 can include a trajectory prediction model 215. The trajectory prediction model 215 can include a graph neural network. The graph neural network can include a plurality of nodes and a plurality of edges. The graph neural network can be configured to receive the object detection data 230, and in response to receipt of the object detection data 230, output motion forecast data 245 with respect to the plurality of actors described by the object detection data 230, for example as described below with reference to FIG. 3., the third party trajectory system 185 can be configured to iteratively update the graph neural network by iteratively updating a plurality of node states respectively associated with the plurality of nodes, for example as described below with reference to FIG. 3.

Figure 3:
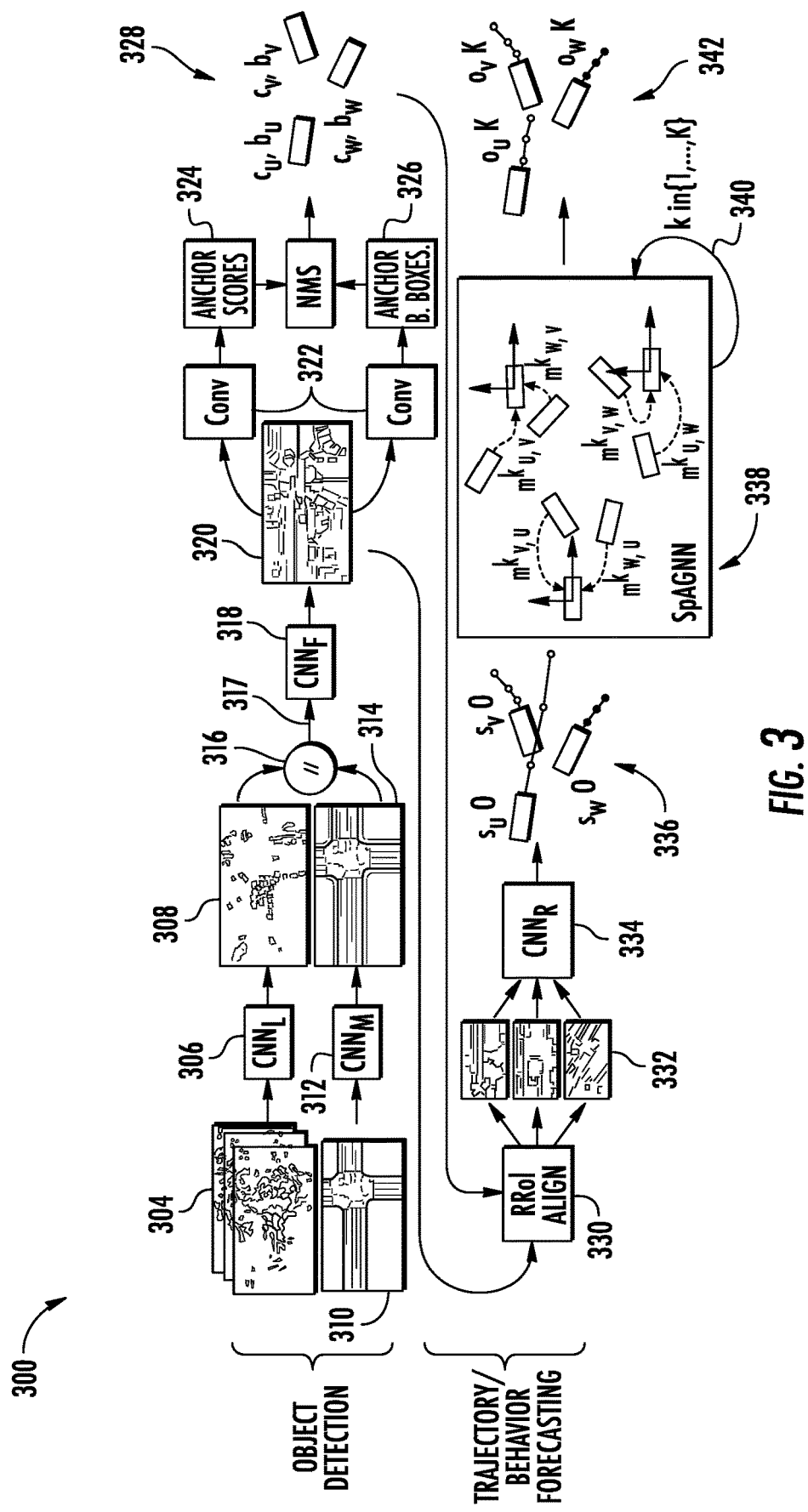
FIG. 3 depicts a simplified flow chart of an example implementation of a method for generating motion forecast data for a plurality of actors with respect to an autonomous vehicle.

FIG. 3 illustrates a simplified flow chart of an example implementation of a method 300 for generating motion forecast data for a plurality of actors with respect to an autonomous vehicle. The method 300 can generally include object detection steps (schematically illustrated in the top row of FIG. 3) and trajectory/behavior forecasting steps (schematically illustrated in the bottom row of FIG. 3).

More specifically, sensor (e.g., LIDAR, photographic, etc.) data 304 can be input into a first machine learned model 306 and sensor object recognition data 308 can be received as an output of the first machine learned model 306. Map data 310 can be input into a second machine learned model 312 and map analysis data 314 can be received as an output of the second machine learned model 312. The sensor object recognition data 308 and map analysis data 314 can be concatenated, at 316, (e.g., along a channel dimension). The concatenated data 317 can be input into a header neural network 318 and intermediate object detection data 320 can be received as an output of the header neural network. The intermediate object detection data 320 can describe the locations of a plurality of actors. For example, the intermediate object detection data 320 can includes bounding box parameters, anchor locations, and/or associated confidence scores. Additional neural networks 322 can be used to produce anchor scores 324 and anchor boxes 326 describing locations of the plurality of actors and/or regions of interest with respect to the plurality of actors. The anchor scores 324 and anchor boxes 326 can be combined. Redundant boxes 326 can be reduced by applying non-maximum suppression (NMS) to generate processed object detection data 328.

In some implementations, input parametrization can be employed that exploits the sensor data 304 and the map data 310. The sensor data 304 can include 3D LiDAR points. A 3D point cloud can be obtained from the LiDAR sensor and voxelized with ground height information from the map data 310 being used to obtain ground-relative heights instead of using the sensor data 304 directly, which can allow the model(s) to learn height priors.

In order to obtain motion information to estimate future behavior, multiple LIDAR sweeps can be leveraged by projecting past sweeps to a coordinate frame of a current sweet by taking into account the ego-motion. Height and time dimensions are stacked into a channel dimension to exploit 2D convolutions. A Bird's Eye View (BEV) 3D occupancy tensor of dimensions can be obtained where $$\left(\frac{L}{\Delta L}, \frac{W}{\Delta W}, \frac{H}{\Delta H}T,\right)$$

(e.g., L=140, W=80, and H=5 meters are the longitudinal, transversal, and normal physical dimensions of the scene; $\Delta L = \Delta W = \Delta H = 0.2$ meters/pixel are the voxel sizes in the corresponding directions and T=10 is the number of past LiDAR sweeps.

An input raster map can include information regarding roads, lanes, intersections, crossings, traffic signs and traffic lights. In such a representation, different semantics can be encoded in separate channels to ease the learning of the CNN(s) and avoid predefining orderings in the raster. For instance, yellow markers denoting the barrier between opposing traffic can be rasterized in a different channel than white markers. In total, this representation can include 17 binary channels.

The object detection network can include one or more backbone networks (e.g., corresponding with neural networks 306, 312) and a header network 318. The backbone network(s) 306, 312 can be used to extract high-level general feature representation of the input in the form of convolutional feature map(s) 308, 314. Further, the backbone network(s) 306, 312 can have high representation capacity to be able to learn robust feature representation. The convolutional neural networks 306, 312 can include convolutional layers and pooling layers. Convolutional layers can be used to extract over-complete representations of the features output from lower level layers. Pooling layers can be used to down-sample the feature map size to save computation and create more robust feature representations. Convolutional neural networks (CNNs) that are applied to images can, for example, have a down-sampling factor of 16 (16×). The header network 318 can be used to make task-specific predictions, and can have a two-stream branch structure (e.g., corresponding with neural networks 306, 312)

One stream (e.g., neural network 306) can process LiDAR point clouds and the other stream (e.g., neural network 312) can processes map data (e.g., HD maps). LiDAR point clouds 304 can be input into this condensed backbone (e.g., neural network 306). To process the high-definition map, this backbone (e.g., neural network 312) can be replicated with half the number of filters at each layer (e.g., for efficiency purposes). After extracting features from the LiDAR and HD map streams, the features can be concatenated, at 316, along the channel dimension. The concatenated features can then fused by the header convolutional network 318. Two convolutional layers can then be used to output confidence score(s) and bounding box parameters for each anchor location, which can be further reduced to the final set of candidates by applying non-maximum suppression (NMS). As a result the object detection can perform fast and accurately.

Referring to the bottom row, trajectory/behavior forecasting of FIG. 3 can be performed based on the processed object detection data 328 using one or more trajectory prediction models. More specifically, a probabilistic formulation can be employed for predicting the future states of detected vehicles. Respective trajectories of each actor can be predicted in a relational fashion with respect to each actor's nearby actors. The i-th actor state at time t can be denoted as $s_{i,t} = \{(x_{i,t}, e_{i,t})\}$. The state can include a future trajectory composed of 2D waypoints $\{x_{i,t}\}$ and heading angles $\{\theta_{i,t}\}$. The input (LiDAR and HD map) of the scene can be denoted as $\Omega$. The number of detected actors in a scene is denoted as N and the future time steps to be predicted is T. The number of actors N can vary from one scene to the other and the relational model is general and works for any cardinality. In some implementations, a fully connected directed graph can be used to let the model figure out the importance of the interplay for each pair of actors in a bidirectional fashion (e.g., when the number of actors in the scene not large (e.g., less than a hundred), etc.). The relationships can be asymmetric (e.g., an actor slowing with adaptive cruise control in response to a vehicle in front of the actor.)

Based on the interaction graph, the joint probability can be composed as follows:

$$p(s_1, \ldots, s_N | \Omega) \propto \prod_i \phi_i(s_i, \Omega) \prod_{ij} \psi_{ij}(s_i, s_j, \Omega) \qquad (1)$$

where the unary and pairwise potentials are, $$\phi_i(s_i, \Omega) = \exp\left(-\frac{1}{2}s_i^T A_{ii} s_i + b_i^T s_i\right) \quad (2)$$

$$\psi_{ij}(s_i, s_j, \Omega) = \exp\left(-\frac{1}{2}s_i^T A_{ij} s_j\right).$$

$A_{ii}$ and $A_{ij}$ depend on the input $\Omega$. Their specific functional forms can be designated flexibility according to the application. The unary potential can follow a Gaussian distribution, for example:

$$(s_i, \Omega) \propto \mathcal{N}(s_i | A_{ii}^{-1} b_i, A_{ii}^{-1})$$

To compute the marginal distribution, $p(s_i|\Omega)$, the mean and precision (inverse covariance) matrix of the message from node i to node j as $\mu_{ij}$ and $P_{ij}$, the following iterative update equations can be derived based on belief propagation algorithm and Gaussian integral:

$$P_{ij} = -A_{ij}^{-1}\left(A_{ii} + \sum_{k \in N(i) \setminus j} P_{ki}\right) A_{ij}^{-1} \quad (3)$$

$$\mu_{ij} = -P_{ij}^{-1} A_{ij}\left(A_{ii} + \sum_{k \in N(i) \setminus j} P_{ki}\right)^{-1}\left(b_i + \sum_{k \in N(i) \setminus j} P_{ki}\mu_{ki}\right),$$

where N(i) is the neighborhood of node i and N(i)\j is the same set without node j. Once the message passing converges, the exact marginal mean and precision can be computed:

$$P_i = A_{ii} + \Sigma_{k \in N(i)} P_{ki} \quad \mu_i = P_i^{-1}(b_i + \Sigma_{k \in N(i)} P_{ki}\mu_{ki}),$$

where $p(s_i|\Omega) = \mathcal{N}(s_i|\mu_i, P_i^{-1})$.

Given an input graph and node states, Graph Neural Networks (GNNs) can be configured to unroll a finite-step message passing algorithm over the graph to update node states. In particular, for each edge, a message vector can be computed in parallel via a shared message function. The shared message function can be defined with a neural network taking the state of the two terminal nodes as input. Each node can aggregate incoming messages from its local neighborhood (e.g., nearby or adjacent actors) using an aggregation operator, e.g., summation. Finally, each node can update its own state based on its previous state and the aggregated message using another neural network. This message passing is repeated for a finite number of times for practical reasons. The main advantages of GNNs are: (1) the model size does not depend on the input graph size; and (2) they have high capacity to learn good representations both at a node and graph level.

Each actor can be modeled as a node, i, in the interaction graph. The node state can be viewed as mean and precision matrix of the marginal Gaussian distribution as in Gaussian Markov random fields (MRFs). Specifically, computing and updating messages as in Eq. (3, 4) can be regarded as particular instantiations of graph neural networks. Therefore, the message passing of GaBP can be generalized using a GNN based on the universal approximation capacity of neural networks. GNNs can be trained using back-propagation and can effectively handle non-Gaussian data thanks to their high capacity. Motivated by the similarity between GaBP and GNN, Spatially aware graph neural networks can be configured as follows.

The node state can include state a hidden state and an output state. For the v-th node, the initial hidden state, $h_v^{(0)}$, can be constructed by extracting the region of interest (RoI) feature map from the detection backbone network for the v-th detection. In particular, "Rotated RoI Align" 330, an improved variant of the RoI pooling and RoI align, can used to extract fix size spatial feature maps 332 for bounding boxes with arbitrary shapes and rotations. A 4-layer down-sampling convolutional network 334 followed by max pooling can be used to reduce the 2D feature map to a 1D feature vector per actor 336.

The output state $o_v^{(k)}$ at each message passing step k can include statistics of the marginal distribution. Specifically, the marginal of each waypoint and angle follow a Gaussian and Von Mises distributions respectively:

$$p(x_v^{(k)}|\Omega) = \mathcal{N}(x_v^{(k)}|\mu_v^{(k)}, \Sigma_v^{(k)}), \text{ and } p(\theta_v^{(k)}|\Omega) = v(\theta_v^{(k)}|\eta_v^{(k)}, \kappa_v^{(k)}),$$

where $$x_v^{(k)} = \begin{pmatrix} x_v^{(k)} \\ y_v^{(k)} \end{pmatrix}, \mu_v^{(k)} = \begin{pmatrix} \mu_{x_v}^{(k)} \\ \mu_{y_v}^{(k)} \end{pmatrix},$$

$$\Sigma_v^{(k)} \begin{pmatrix} \sigma_{x_v}^{(k)2} & p_v^{(k)}\sigma_{x_v}^{(k)}\sigma_{y_v}^{(k)} \\ p_v^{(k)}\sigma_{x_v}^{(k)}\sigma_{y_v}^{(k)} & \sigma_{y_v}^{(k)2} \end{pmatrix}.$$

Therefore, the predicted output state, $o_v^{(k)}$, is the concatenation of the parameters of both distributions $\mu_{x_v}^{(k)}, \mu_{y_v}^{(k)}, \rho_v^{(k)}, \sigma_{x_v}^{(k)}, \sigma_{y_v}^{(k)}, \eta_v^{(k)}, \kappa_v^{(k)}$. The goal is to gradually improve the output states in the GNN as the message passing algorithm goes on. Note that the likelihood can be evaluated using the local coordinate system centered at each actor and oriented in a way that the x-axis is aligned with the heading direction of the respective actor. This can make the learning task easier compared to using a global anchor coordinate system. To initialize the output state, $o_v^{(0)}$, a multi-layer perceptron (MLP) can be employed which takes the max-pooled ROI features $h_v^{(0)}$ as input and directly predicts the output state, independently per actor.

The node states in the Spatially Aware GNN (SpAGNN) 338 can be iteratively updated by a message passing process. For example, for each directed edge (u, v), at propagation step k, the respective message, $m_{u \to v}^{(k)}$, can be computed as follows:

$$m_{u \to v}^{(k)} = \text{edge}^{(k)}(h_u^{k-1}, h_v^{k-1}, \mathcal{T}_{u,v}(o_u^{(k-1)}), o_v^{(k-1)}, b_u, b_v) \quad (5)$$

where $\text{edge}^{(k)}$ is an MLP and $\mathcal{T}_{u,v}$ is the transformation from the coordinate system of detected box $b_u$ to the one of $b_v$. The state $o_u^{(k)}$ for each neighbor of node v can be rotated such that the states are relative to the local coordinate system of v. By doing so, the model can be described as "aware" of spatial relationships between the actors, which can improve learning. Otherwise extracting such information from local, RoI pooled features can be very difficult. There are several advantages of projecting the output state of node u to the local coordinate system of node v when computing the message $m_{u \to v}^{(k)}$. For example, in an experimental evaluation of the present method, projecting the output state of node u to the local coordinate system of node v was found to reduce an experimentally determined collision rate. After computing the messages on all edges, the messages going to node v can be aggregated as follows:

$$a_v^{(k)} = \text{aggregate}^{(k)}(\{m_{u \to v}^{(k)}: u \in N(v)\}), \quad (6)$$

A feature-wise max operator along the neighborhood dimension can be used as an aggregate$^{(k)}$ function. Once the aggregated message $a_v^{(k)}$ is computed, the node state can be updated:

$$h_v^{(k)} = \text{update}^{(k)}(h_v^{(k-1)}, a_v^{(k)}) \quad o_v^{(k)} = \text{output}^{(k)}(h_v^{(k)}) \quad (7)$$

where update$^{(k)}$ can be a gated recurrent unit (GRU) cell and output$^{(k)}$ can be another MLP.

The above message passing process 340 can be unrolled for K steps, where K is a hyperparameter. The final prediction of the model 342 can be expressed as $O^K = \{o_v^{(K)}\}$, and can correspond with the motion forecast data 245 described above with respect to FIG. 2.

Figure 4:
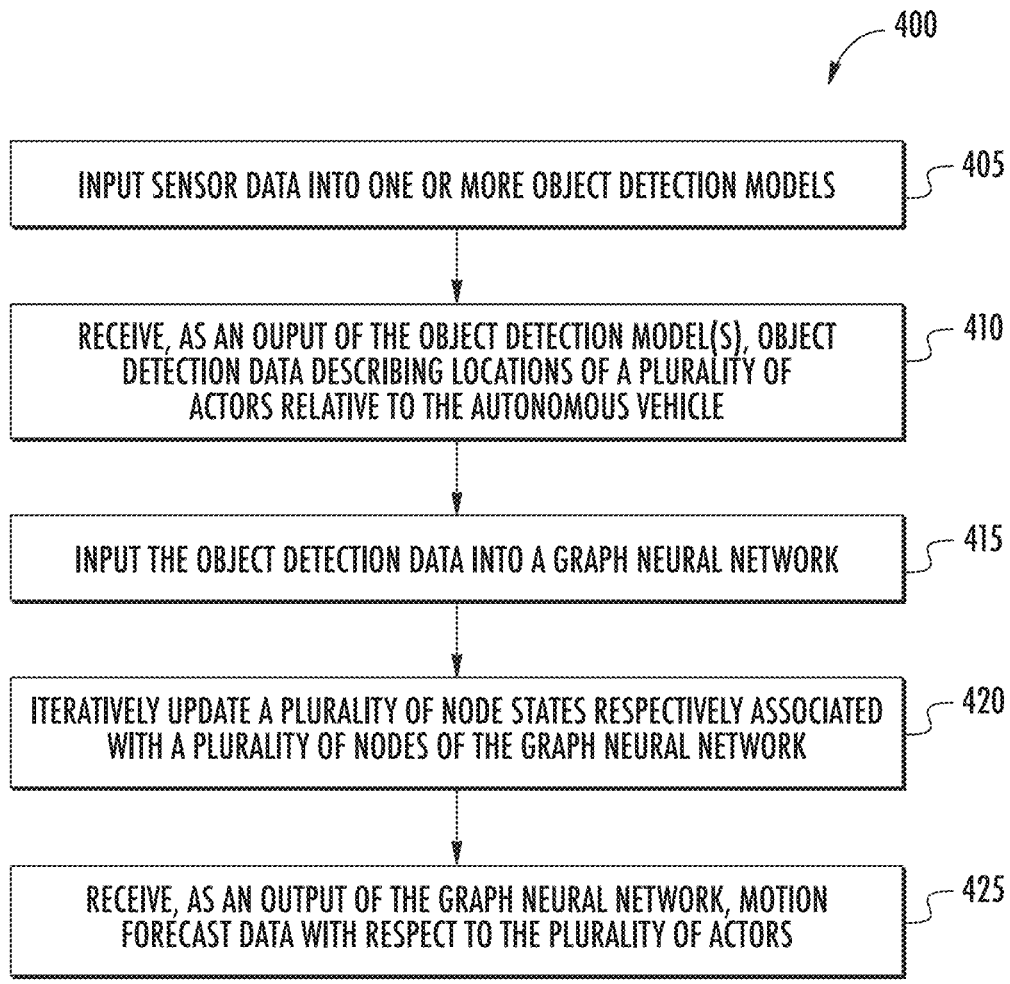
FIG. 4 depicts an example flow diagram of an example method for generating motion forecast data for a plurality of actors with respect to an autonomous vehicle.

FIG. 4 depicts an example flow diagram of an example method 400 for generating motion forecast data for a plurality of actors with respect to an autonomous vehicle. One or more portion(s) of the method 400 can be can be implemented by a computing system that includes one or more computing devices such as, for example, the computing systems described with reference to the other figures (e.g., the vehicle computing system 100, the third party trajectory system 185, the operations computing system 195, etc.). Each respective portion of the method 400 can be performed by any (or any combination) of one or more computing devices. Moreover, one or more portion(s) of the method 400 can be implemented as an algorithm on the hardware components of the device(s) described herein (e.g., as in FIGS. 1 through 3), for example, to determine motion forecast data 245 for the plurality of actors. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 4 is described with reference to elements/terms described with respect to other systems and figures for example illustrated purposes and is not meant to be limiting. One or more portions of method 400 can be performed additionally, or alternatively, by other systems.

At (405), the method 400 can include inputting sensor data 140 into one or more object detection model(s) 210. For instance, an autonomous vehicle (e.g., vehicle 105) can obtain, via one or more vehicle sensors 125, sensor data 140 associated with a surrounding environment of the autonomous vehicle (e.g., vehicle 105). In some implementations, the sensor data 140 can include a plurality of LIDAR sweeps, a sequence of image frames, or the like. A computing system (e.g., vehicle computing system, robotic system, etc.) can input the sensor data 140 into the object detection model(s) 210.

At (410), the method 400 can include receiving, as an output of the object detection model(s) 210, the object detection data 230, 328 describing the location of the plurality of the actors relative to the autonomous vehicle. For example, the object detection data 230, 328 can include bounding boxes, regions or interest, or the like identifying the locations of the actors. The computing system (e.g., a vehicle computing system) can receive, as an output of the object detection model(s) 210, the object detection data 230, 328 describing the location of the plurality of the actors relative to the autonomous vehicle.

At (415), the method 400 can include inputting the object detection data 230 into a graph neural network, for example included in the trajectory prediction model(s) 215. The computing system (e.g., a vehicle computing system) can input the object detection data 230 into the graph neural network (e.g., into the trajectory prediction model(s) 215, which can include the graph neural network).

At (420), the method 400 can include iteratively updating a plurality of node states respectively associated with the plurality of nodes. For example messages can be iteratively passed from respective transmitting nodes of the plurality of nodes to respective receiving nodes of the plurality of nodes, for example as described above with respect to message passing 340 of FIG. 3. The computing system (e.g., a vehicle computing system) can iteratively update a plurality of node states respectively associated with the plurality of nodes.

The graph neural network can be "spatially aware," for example as described above with reference to the SpAGNN 338 of FIG. 3. For example, the messages passed between nodes can be transformed into respective local coordinate systems of the respective nodes that are receiving the messages. For each respective node of the plurality of nodes, the plurality of respective messages from each other node can be aggregated to update the respective node. The respective messages can include data describing relative locations and/or relative trajectories of the other nodes with respect to the receiving node of the plurality of nodes.

In some implementations, the nodes can have respective hidden node states and output node states. The output node states can be shared, while the hidden node states can be not shared between the nodes. The hidden node states can be updated as described above based on the received messages which can include or describe the output node states of the other nodes (e.g., after being transformed into the local coordinate system of the receiving node).

In some implementations, multilayer perceptrons (MLP) can be leveraged. For example, the object detection data can be input into a plurality of MLPs, and the MLPs can output the output node states. For example, the "edges" can be modeled as MLPs. As another example, message aggregation can be performed using one or more MLPs. MLPs can be included in one or more machine-learned models described herein.

At (425), the method 400 can include receiving, as an output of the graph neural network (e.g., the trajectory prediction model(s) 215 or SpAGNN 338) the motion forecast data 245, 342 with respect to the plurality of actors. Iteratively updating the plurality of nodes states can include, for each respective node of the plurality of nodes, aggregating a plurality of respective messages from each other node of the plurality of nodes. The computing system (e.g., a vehicle computing system) can receive, as an output of the graph neural network (e.g., the trajectory prediction model(s) 215 or SpAGNN 338) the motion forecast data 245, 342 with respect to the plurality of actors.

Figure 5:
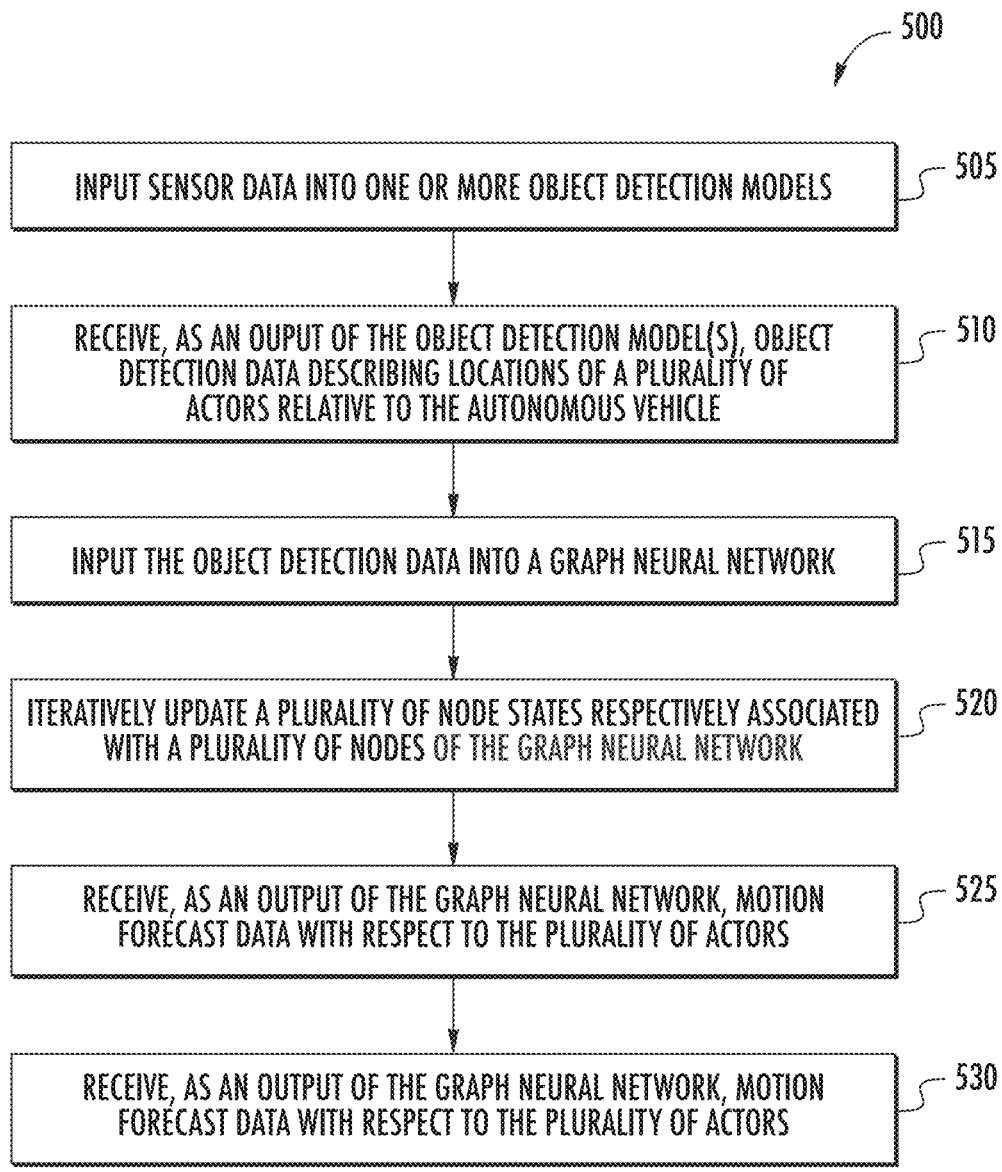
FIG. 5 depicts an example flow diagram of an example method for training a graph neural network generating motion forecast data for a plurality of actors with respect to an autonomous vehicle according to example implementations of the present disclosure.

FIG. 5 depicts an example flow diagram of an example method 500 for training a graph neural network generating motion forecast data 245, 342 for a plurality of actors with respect to an autonomous vehicle. One or more portion(s) of the method 450 can be can be implemented by a computing system that includes one or more computing devices such as, for example, the computing systems described with reference to the other figures (e.g., the vehicle computing system 100, the third party trajectory system 185, the operations computing system 195, etc.). Each respective portion of the method 450 can be performed by any (or any combination) of one or more computing devices. Moreover, one or more portion(s) of the method 450 can be implemented as an algorithm on the hardware components of the device(s) described herein (e.g., as in FIGS. 1 through 3), and/or on a training computing system accessible by a network. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 4 is described with reference to elements/terms described with respect to other systems and figures for example illustrated purposes and is not meant to be limiting. One or more portions of method 450 can be performed additionally, or alternatively, by other systems.

The method 500 can include steps 505, 510, 515, 520, 525 corresponding with 405, 410, 415, 420, 425 described above with reference to FIG. 4. The method 500 can further include, at 530, adjusting at least one parameter of the graph neural network based on a comparison of the motion forecast data 245, 342 with respect to ground truth motion forecast data. As one example, the ground truth motion forecast data can include actual future trajectories of the actors. Ground truth motion forecast data can be generated or gathered from a variety of sources, including real-world TOR4D dataset.

In some implementations, multiple models (e.g., each machine-learned model of the system including detection and relational prediction) can be trained jointly end-to-end through back-propagation. More specifically, in some implementations, errors can be sequentially back-propagated through the trajectory prediction model(s) 215 (including the graph neural network) and the object detection model 210 to determine a gradient of a loss function. Parameters of one or both of the trajectory prediction model(s) 215 (including the graph neural network) and the object detection model 210 can be adjusted based on the gradient of the loss function.

For example, a multi-task objective can be initiated that contains a binary cross entropy loss for the classification branch of the detection network (background vs vehicle), a regression loss to fit the detection bounding boxes and a negative log likelihood term for the probabilistic trajectory prediction.

Hard negative mining can be applied to the classification loss. For example, all positive examples can be selected from the ground-truth and three times as many negative examples from the rest of anchors. Regarding box fitting, a smooth L1 loss can be applied to each of the parameters (e.g., x, y, w, h, sin(θ), cos(θ))) of the bounding boxes and anchored to a positive example. The negative log-likelihood (NLL) can be defined as follows:

$$\mathcal{L}_{nll} = \sum_{i=1}^{N}\sum_{t=1}^{T}\frac{1}{2}\log|\sum_{i,t}| + $$

$$\frac{1}{2}(x_{i,t} - \mu_{i,t})^T \sum_{i,t}^{-1}(x_{i,t} - \mu_{i,t}) - \kappa_{i,t}\cos(\theta_{i,t} - \eta_{i,t}) + \log(2\pi I_0(\kappa_{i,t}))$$

where the first line corresponds to the NLL of a 2D Gaussian distribution and the second line to corresponds with the NLL of a Von Mises distribution, $I_0$, being the modified Bessel function of order 0. For the message passing of GNN, back propagation through time can be used to pass the gradient to the detection backbone network.

Figure 6:
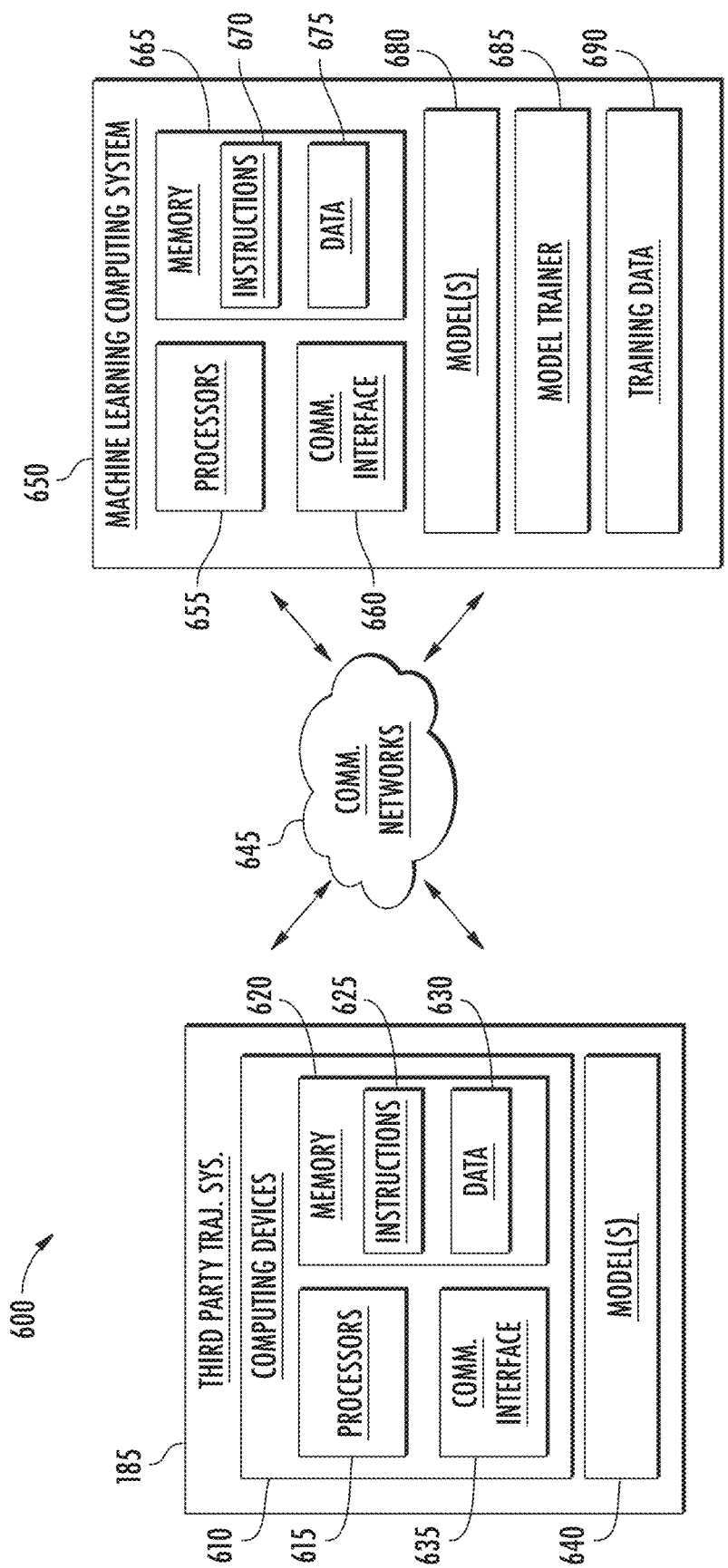
FIG. 6 depicts example system components of an example system according to example implementations of the present disclosure.

FIG. 6 depicts example system components of an example system 600 according to example implementations of the present disclosure. The example system 600 illustrated in FIG. 6 is provided as an example only. The components, systems, connections, and/or other aspects illustrated in FIG. 6 are optional and are provided as examples of what is possible, but not required, to implement the present disclosure. The example system 600 can include a third party trajectory system 185 and a machine learning computing system 650 that are communicatively coupled over one or more network(s) 640. As described herein, the third party trajectory system 185 can be implemented onboard a vehicle (e.g., as a portion of the vehicle computing system 100) and/or can be remote from a vehicle (e.g., as a portion of an operations computing system 195). In either case, a vehicle computing system 100 can utilize the operations and model(s) of the third party trajectory system 185 (e.g., locally, via wireless network communication, etc.).

The third party trajectory system 185 can include one or computing device(s) 610. The computing device(s) 610 of the third party trajectory system 185 can include processor(s) 615 and a memory 620. The one or more processor(s) 615 can be any suitable processing device (e.g., a processor core, a microprocessor, an ASIC, a FPGA, a controller, a microcontroller, etc.) and can be one processor or a plurality of processors that are operatively connected. The memory 620 can include one or more non-transitory computer-readable storage media, such as RAM, ROM, EEPROM, EPROM, one or more memory devices, flash memory devices, etc., and/or combinations thereof.

The memory 620 can store information that can be obtained by the one or more processor(s) 615. For instance, the memory 620 (e.g., one or more non-transitory computer-readable storage mediums, memory devices, etc.) can include computer-readable instructions 625 that can be executed by the one or more processors 615. The instructions 625 can be software written in any suitable programming language or can be implemented in hardware. Additionally, or alternatively, the instructions 625 can be executed in logically and/or virtually separate threads on processor(s) 615.

For example, the memory 620 can store instructions 625 that when executed by the one or more processors 615 cause the one or more processors 615 (e.g., of the third party trajectory system 185) to perform operations such as any of the operations and functions of the third party trajectory system 185 and/or for which the third party trajectory system 185 is configured, as described herein, the operations for determining object intent based on physical attributes (e.g., one or more portions of method 500), the operations and functions of any of the models described herein and/or for which the models are configured and/or any other operations and functions for the third party trajectory system 185, as described herein.

The memory 620 can store data 630 that can be obtained (e.g., received, accessed, written, manipulated, generated, created, stored, etc.). The data 630 can include, for instance, sensor data, object detection data, data describing a graph neural network (e.g., including data describing node states and/or nodes), motion forecast data, data describing one or more models described herein (e.g., the object detection model, graph neural network, and/or trajectory prediction model(s)), and/or other data/information described herein. In some implementations, the computing device(s) 610 can obtain data from one or more memories that are remote from the third party trajectory system 185.

The computing device(s) 610 can also include a communication interface 635 used to communicate with one or more other system(s) (e.g., other systems onboard and/or remote from a vehicle, the other systems of FIG. 1, etc.). The communication interface 635 can include any circuits, components, software, etc. for communicating via one or more networks (e.g., 645). In some implementations, the communication interface 635 can include, for example, one or more of a communications controller, receiver, transceiver, transmitter, port, conductors, software and/or hardware for communicating data/information.

According to an aspect of the present disclosure, the third party trajectory system 185 can store or include one or more machine-learned models 640. As examples, the machine-learned model(s) 640 can be or can otherwise include the object detection model(s) 210 and/or the trajectory prediction model(s) 215. The machine-learned model(s) 640 can be or include neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks, etc.), recurrent neural networks (e.g., long short-term memory recurrent neural networks, etc.), and/or other forms of neural networks.

In some implementations, the third party trajectory system 185 can receive the one or more machine-learned models 640 from the machine learning computing system 650 over the network(s) 645 and can store the one or more machine-learned models 640 in the memory 620 of the third party trajectory system 185. The third party trajectory system 185 can use or otherwise implement the one or more machine-learned models 640 (e.g., by processor(s) 615). In particular, the third party trajectory system 185 can implement the machine learned model(s) 640 to forecast actor motion data, as described herein.

The third party trajectory system 185 can iteratively update a plurality of node states respectively associated with the plurality of nodes of the graph neural network, for example as described herein. For example, third party trajectory system 185 can pass messages between transmitting and receiving nodes.

The machine learning computing system 650 can include one or more processors 655 and a memory 665. The one or more processors 655 can be any suitable processing device (e.g., a processor core, a microprocessor, an ASIC, a FPGA, a controller, a microcontroller, etc.) and can be one processor or a plurality of processors that are operatively connected. The memory 665 can include one or more non-transitory computer-readable storage media, such as RAM, ROM, EEPROM, EPROM, one or more memory devices, flash memory devices, etc., and/or combinations thereof.

The memory 665 can store information that can be accessed by the one or more processors 655. For instance, the memory 665 (e.g., one or more non-transitory computer-readable storage mediums, memory devices, etc.) can store data 675 that can be obtained (e.g., generated, retrieved, received, accessed, written, manipulated, created, stored, etc.). In some implementations, the machine learning computing system 650 can obtain data from one or more memories that are remote from the machine learning computing system 650.

The memory 665 can also store computer-readable instructions 670 that can be executed by the one or more processors 655. The instructions 670 can be software written in any suitable programming language or can be implemented in hardware. Additionally, or alternatively, the instructions 670 can be executed in logically and/or virtually separate threads on processor(s) 655. The memory 665 can store the instructions 670 that when executed by the one or more processors 655 cause the one or more processors 655 to perform operations. The machine learning computing system 650 can include a communication interface 660, including devices and/or functions similar to that described with respect to the third party trajectory system 185.

In some implementations, the machine learning computing system 650 can include one or more server computing devices. If the machine learning computing system 650 includes multiple server computing devices, such server computing devices can operate according to various computing architectures, including, for example, sequential computing architectures, parallel computing architectures, or some combination thereof.

In addition, or alternatively to the model(s) 640 at the third party trajectory system 185, the machine learning computing system 650 can include one or more machine-learned model(s) 680. As examples, the machine-learned model(s) 680 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks), recurrent neural networks (e.g., long short-term memory recurrent neural networks, etc.), and/or other forms of neural networks. The machine-learned models 680 can be similar to and/or the same as the machine-learned models 640, and/or any of the models discussed herein with reference to FIGS. 1 through 3.

As an example, the machine learning computing system 650 can communicate with the third party trajectory system 185 according to a client-server relationship. For example, the machine learning computing system 650 can implement the machine-learned models 680 to provide a web service to the third party trajectory system 185 (e.g., including on a vehicle, implemented as a system remote from the vehicle, etc.). For example, the web service can provide machine-learned models to an entity associated with a vehicle; such that the entity can implement the machine-learned model (e.g., to determine object intent, etc.). Thus, machine-learned models 680 can be located and used at the third party trajectory system 185 (e.g., on the vehicle 105, at the operations computing system 195, etc.) and/or the machine-learned models 680 can be located and used at the machine learning computing system 650.

In some implementations, the machine learning computing system 650 and/or the third party trajectory system 185 can train the machine-learned model(s) 640 and/or 680 through the use of a model trainer 685. The model trainer 685 can train the machine-learned models 640 and/or 680 using one or more training or learning algorithm(s), for example as described above with reference to FIG. 5. The model trainer 785 can perform backwards propagation of errors, supervised training techniques using a set of labeled training data, and/or unsupervised training techniques using a set of unlabeled training data. The model trainer 685 can perform a number of generalization techniques to improve the generalization capability of the models being trained. Generalization techniques include weight decays, dropouts, or other techniques.

The model trainer 680 can train a machine-learned model (e.g., 640 and/or 680) based on a set of training data 690. The training data 690 can include, for example, labeled datasets and/or unlabeled datasets.

In some implementations, the training data 690 can be taken from the same vehicle as that which utilizes the model(s) 640 and/or 680. Accordingly, the model(s) 640 and/or 680 can be trained to determine outputs in a manner that is tailored to that particular vehicle. Additionally, or alternatively, the training data 690 can be taken from one or more different vehicles than that which is utilizing the model(s) 640 and/or 680. The model trainer 685 can be implemented in hardware, firmware, and/or software controlling one or more processors. Additionally, or alternatively, other data sets can be used to train the model(s) (e.g., models 640 and/or 680) including, for example, publicly accessible datasets (e.g., labeled data sets, unlabeled data sets, etc.).

The network(s) 645 can be any type of network or combination of networks that allows for communication between devices. In some embodiments, the network(s) 645 can include one or more of a local area network, wide area network, the Internet, secure network, cellular network, mesh network, peer-to-peer communication link and/or some combination thereof and can include any number of wired or wireless links. Communication over the network(s) 645 can be accomplished, for instance, via a network interface using any type of protocol, protection scheme, encoding, format, packaging, etc.

FIG. 6 illustrates one example system 600 that can be used to implement the present disclosure. Other computing systems can be used as well. For example, in some implementations, the third party trajectory system 185 can include the model trainer 685 and the training dataset 690. In such implementations, the machine-learned models 640 can be both trained and used locally at the third party trajectory system 185 (e.g., at the vehicle 105).

Computing tasks discussed herein as being performed at computing device(s) remote from the vehicle 105 can instead be performed at the vehicle 105 (e.g., via the vehicle computing system 100), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Figure 7:
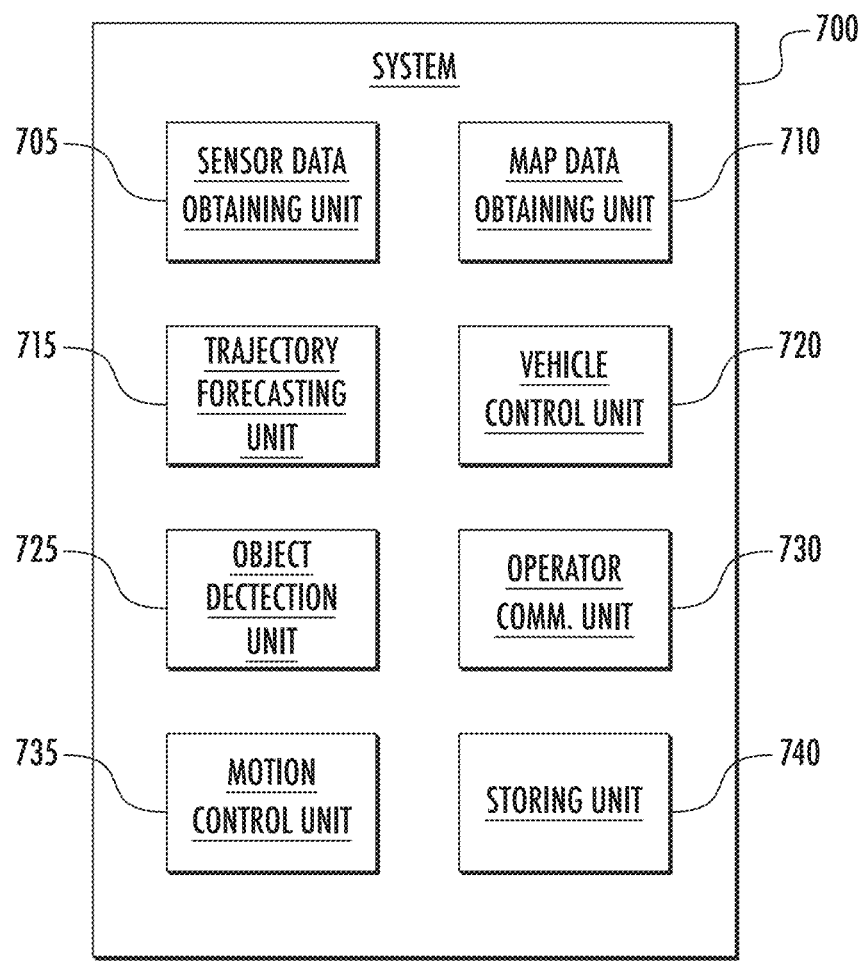
FIG. 7 depicts example system components of an example system according to example implementations of the present disclosure.

FIG. 7 depicts example system components of an example system according to example implementations of the present disclosure. Various means can be configured to perform the methods and processes described herein. For example, a computing system 700 can include sensor data obtaining unit(s) 705, map data obtaining unit(s) 710, machine-learned object recognition/detection model application unit(s) 725, trajectory/behavior forecasting unit(s) 715, vehicle controlling unit(s) 720, operator communication unit(s) 730, data storing unit(s) 740, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain sensor data from one or more sensors that generate sensor data relative to an autonomous vehicle. In some implementations, the means can be configured to obtain sensor data associated with the autonomous vehicle's surrounding environment as well as the position and movement of the autonomous vehicle. In some implementations, the means can be configured to obtain LIDAR data (e.g., a three-dimensional point cloud) obtained from a LIDAR system. In some implementations, the means can be configured to obtain image data obtained from one or more cameras. In some implementations, the means can be configured to obtain a birds-eye view representation of data obtained relative to the autonomous vehicle. A sensor data obtaining unit 705 is one example of a means for obtaining such sensor data as described herein.

The means can be configured to access or otherwise obtain map data associated with a surrounding geographic environment of the autonomous vehicle. More particularly, in some implementations, the means can be configured to access or otherwise obtain map data that provides information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system in processing, analyzing, and perceiving its surrounding environment and its relationship thereto. In some implementations, the means can be configured to access or otherwise obtain map data that is provided in a birds-eye view representation, such as generated by rasterization or other suitable processing format. A map data obtaining unit 710 is one example of a means for obtaining such map data as described herein.

The means can be configured to provide the input sensor data into the object detection model and to receive the object detection data as an output of the object detection model. A machine learned object detection model unit 725 is one example of a means for providing the sensor data and map data as inputs to the machine learned object detection model and receiving multiple outputs therefrom.

The means can be configured to generate motion forecast data that describes or predicts the trajectory/behavior of a plurality of actors with respect to the autonomous vehicle. The means can be configured to input object detection data into the graph neural network and iteratively update a plurality of node states respectively associated with the plurality of nodes of the graph neural network. The means can be configured to receive, as an output of the graph neural network, the motion forecast data with respect to the plurality of actors. The trajectory/behavior forecasting unit(s) 715 is one example of a means for performing the above operations.

The means can be configured to determine a motion plan for the autonomous vehicle based at least in part on the motion forecast data. The means can be configured to determine a motion plan for the autonomous vehicle that best navigates the autonomous vehicle along a determined travel route relative to the objects at such locations. In some implementations, the means can be configured to determine a cost function for each of one or more candidate motion plans for the autonomous vehicle based at least in part on the current locations and/or predicted future locations and/or moving paths of the objects. A motion planning/control unit 735 is one example of a means for determining a motion plan for the autonomous vehicle.

The means can be configured to control one or more vehicle controls (e.g., actuators or other devices that control gas flow, steering, braking, etc.) to execute the selected motion plan. A vehicle controlling unit 720 is one example of a means for controlling motion of the autonomous vehicle to execute the motion plan.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system, comprising:
   an object detection model configured to receive sensor data, and in response to receipt of the sensor data, generate object detection data describing locations of a plurality of actors relative to an autonomous vehicle;
   a graph neural network comprising a plurality of nodes and a plurality of edges, the graph neural network configured to receive the object detection data, and in response to receipt of the object detection data, output motion forecast data with respect to the plurality of actors;
   a memory that stores a set of instructions;
   one or more processors which use the set of instructions to:
      input sensor data into one or more object detection models;
      receive, as an output of the one or more object detection models, the object detection data describing the locations of the plurality of the actors relative to the autonomous vehicle;
      input the object detection data into the graph neural network;
      iteratively update a plurality of node states respectively associated with the plurality of nodes;
      receive, as an output of the graph neural network, the motion forecast data with respect to the plurality of actors;
      determine a motion plan for the autonomous vehicle based at least in part on the motion forecast data; and
      control the autonomous vehicle based at least in part on the motion plan.

2. The computing system of claim 1, wherein iteratively updating the plurality of nodes states comprises passing a plurality of messages from a transmitting node of the plurality of nodes to a receiving node of the plurality of nodes.

3. The computing system of claim 2, wherein a number of the plurality of messages that are passed from the transmitting node of the plurality of nodes to the receiving node of the plurality of nodes corresponds with a hyperparameter of the system.

4. The computing system of claim 2, wherein passing the plurality of messages from the transmitting node of the plurality of nodes to the receiving node of the plurality of nodes comprises transforming the message into a local coordinate system of the respective receiving node.

5. The computing system of claim 1, wherein iteratively updating the plurality of nodes states comprises, for each respective node of the plurality of nodes, aggregating a plurality of respective messages from each other node of the plurality of nodes.

6. The computing system of claim 5, wherein the respective messages comprise data describing at least one of relative locations or relative trajectories of the other nodes with respect to the respective node of the plurality of nodes.

7. The computing system of claim 1, wherein iteratively updating the plurality of the node states comprises, for each respective node of the plurality of node states, updating a respective hidden node state and a respective output node state of the respective node.

8. The computing system of claim 1, further comprising a plurality of multilayer perceptrons, and wherein iteratively updating the plurality of the node states comprises, for each of the plurality of node states:
   inputting the object detection data into the plurality of multilayer perceptrons; and
   receiving, as respective outputs of the plurality of multilayer perceptrons, a plurality of output node states.

9. The computing system of claim 1, wherein the one or more object detection models are further configured to receive map data and generate the object detection data based at least in part on the map data, and wherein the one or more processors further use the set of instructions to input the map data into the one or more object detection models.

10. A computer-implemented method for forecasting actor motion data:
    inputting, by a computing system comprising one or more computing devices, sensor data into one or more object detection models configured to receive sensor data, and in response to receipt of the sensor data, generate object detection data describing locations of a plurality of actors relative to an autonomous vehicle;
    receiving, by the computing system and as an output of the one or more object detection models, the object detection data describing the location of the plurality of the actors relative to the autonomous vehicle;
    inputting, by the computing system, the object detection data into a graph neural network comprising a plurality of nodes and a plurality of edges, the graph neural network configured to receive the object detection data, and in response to receipt of the object detection data, output motion forecast data with respect to the plurality of actors;
    iteratively updating, by the computing system, a plurality of node states respectively associated with the plurality of nodes;
    receiving, by the computing system and as an output of the graph neural network, the motion forecast data with respect to the plurality of actors;
    determine a motion plan for the autonomous vehicle based at least in part on the motion forecast data; and
    control the autonomous vehicle based at least in part on the motion plan.

11. The computer-implemented method of claim 10, wherein iteratively updating the plurality of nodes states comprises passing a plurality of messages from a transmitting node of the plurality of nodes to a receiving node of the plurality of nodes.

12. The computer-implemented method of claim 11, wherein a number of the plurality of messages that are passed from the transmitting node of the plurality of nodes to the receiving node of the plurality of nodes corresponds with a hyperparameter of the system.

13. The computer-implemented method of claim 11, wherein passing the plurality of messages from the transmitting node of the plurality of nodes to the receiving node of the plurality of nodes comprises transforming the message into a local coordinate system of the respective receiving node.

14. The computer-implemented method of claim 10, wherein iteratively updating the plurality of nodes states comprises, for each respective node of the plurality of nodes, aggregating a plurality of respective messages from each other node of the plurality of nodes.

15. The computer-implemented method of claim 14, wherein the respective messages comprise data describing at least one of relative locations or relative trajectories of the other nodes with respect to the respective node of the plurality of nodes.

16. The computer-implemented method of claim 10, wherein iteratively updating the plurality of the node states comprises, for each of the plurality of node states, updating a respective hidden node state and a respective output node state.

17. The computer-implemented method of claim 10, wherein iteratively updating the plurality of the node states comprises, for each of the plurality of node states:
inputting the object detection data into a plurality of multilayer perceptrons; and
receiving, as respective outputs of the plurality of multilayer perceptrons, a plurality of output node states.

18. A computer-implemented method for training a graph neural network for generating actor motion forecast data, the method comprising:
inputting, by a computing system comprising one or more computing devices, sensor data into one or more object detection models configured to receive the sensor data, and in response to receipt of the sensor data, output object detection data describing locations of a plurality of actors relative to an autonomous vehicle;
receiving, by the computing system and as an output of the one or more object detection models, the object detection data describing the location of the plurality of the actors relative to the autonomous vehicle;
inputting, by the computing system, the object detection data into a graph neural network comprising a plurality of nodes and a plurality of edges, the graph neural network configured to receive the object detection data, and in response to receipt of the object detection data, output motion forecast data with respect to the plurality of actors;
iteratively updating, by the computing system, a plurality of node states respectively associated with the plurality of nodes;
receiving, by the computing devices and as an output of the graph neural network, the motion forecast data with respect to the plurality of actors;
adjusting, by the computing system, at least one parameter of the graph neural network based on a comparison of the motion forecast data with respect to ground truth motion forecast data;
determine a motion plan for the autonomous vehicle based at least in part on the motion forecast data; and
control the autonomous vehicle based at least in part on the motion plan.

19. The computer-implemented method of claim 18, further comprising evaluating, by the computing system, a loss function that describes the comparison of the motion forecast data with respect to ground truth motion forecast data and adjusting, by the computing system, at least one parameter of the one or more object detection models and at least one parameter of the graph neural network based on the evaluation of the loss function.

20. The computer-implemented method of claim 18, further comprising back-propagating, by the computing system, errors through the graph neural network and the one or more object detection models to determine, by the computing system, a gradient of the loss function to train to the graph neural network and the one or more object detection models in an end-to-end configuration.

* * * * *